(12) United States Patent
Xiao et al.

(10) Patent No.: US 10,815,875 B2
(45) Date of Patent: *Oct. 27, 2020

(54) METHOD AND SYSTEM FOR BOOSTED ENGINE SYSTEM

(71) Applicant: Ford Global Technologies, LLC, Dearborn, MI (US)

(72) Inventors: Baitao Xiao, Canton, MI (US); John Erik Mikael Hellstrom, Ann Arbor, MI (US); Adam Nathan Banker, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 711 days.

This patent is subject to a terminal disclaimer.

(21) Appl. No.: 15/474,813

(22) Filed: Mar. 30, 2017

(65) Prior Publication Data

US 2018/0283267 A1 Oct. 4, 2018

(51) Int. Cl.
*F02B 37/14* (2006.01)
*F02B 37/10* (2006.01)
*F02B 37/18* (2006.01)
*F02D 41/00* (2006.01)
*F02B 37/04* (2006.01)
(Continued)

(52) U.S. Cl.
CPC ............... *F02B 37/14* (2013.01); *B60K 6/20* (2013.01); *F02B 37/04* (2013.01); *F02B 37/10* (2013.01); *F02B 37/16* (2013.01); *F02B 37/18* (2013.01); *F02D 41/0005* (2013.01); *F02D 41/0007* (2013.01); *F02D 41/123* (2013.01); *F02B 2037/122* (2013.01); *F02D 41/0087* (2013.01); *F02D 41/107* (2013.01); *F02D 41/1497* (2013.01); *F02D 2200/0406* (2013.01); *F02D 2200/602* (2013.01); *F02D 2200/604* (2013.01); *Y02T 10/144* (2013.01)

(58) Field of Classification Search
CPC .......... F02B 37/04; F02B 37/10; F02B 37/14; F02B 37/16; F02B 37/18; F02B 37/013; F02D 41/0005; F02D 41/0007; F02D 41/123
See application file for complete search history.

(56) References Cited

U.S. PATENT DOCUMENTS 6,938,420 B2 9/2005 Kawamura et al.
7,210,296 B2 5/2007 Bolz et al.
(Continued)

OTHER PUBLICATIONS

Figurella, N. et al., "Effect of inlet guide vanes on centrifugal compressor acoustics and performance," Noise control Engineering Journal, vol. 62, No. 4, Jul. 1, 2014, 6 pages.
(Continued)

*Primary Examiner* — Ngoc T Nguyen
(74) *Attorney, Agent, or Firm* — Geoffrey Brumbaugh; McCoy Russell LLP

(57) ABSTRACT

Methods and systems are provided for increasing vehicle maneuverability when operating on sand, snow, or rocky terrain, as well as while performing cornering and sliding maneuvers. Boost path actuators are held in positions that enable manifold pressure to be held above barometric pressure as torque demand changes, including when torque demand drops. Engine torque is reduced or raised via adjustments to one or more of fuel delivery, spark timing, and intake throttle opening.

20 Claims, 6 Drawing Sheets

(51) Int. Cl.
*F02B 37/16* (2006.01)
*B60K 6/20* (2007.10)
*F02D 41/12* (2006.01)
F02B 37/12 (2006.01)
F02D 41/10 (2006.01)
F02D 41/14 (2006.01)

(56) References Cited

U.S. PATENT DOCUMENTS

| | | |
|---|---|---|
| 8,086,391 B2 | 12/2011 | Miah |
| 8,374,742 B2 | 2/2013 | Ulrey et al. |
| 9,027,343 B2 | 5/2015 | Pursifull |
| 9,243,550 B2 | 1/2016 | Miazgowicz et al. |
| 9,371,070 B2 | 6/2016 | Chinbe et al. |
| 10,337,418 B2 * | 7/2019 | Rollinger ............ F02D 41/0087 |
| 2011/0144884 A1 | 6/2011 | Miah |
| 2014/0260241 A1 | 9/2014 | Jankovic et al. |
| 2017/0016389 A1 | 1/2017 | Xiao et al. |
| 2017/0138278 A1 | 5/2017 | Xiao et al. |
| 2018/0283268 A1 * | 10/2018 | Xiao ....................... F02B 37/10 |

OTHER PUBLICATIONS

Xiao, B. et al., "Method and System for Boost Pressure Control," U.S. Appl. No. 15/160,842, filed May 20, 2016, 49 pages.
Xiao, B. et al., "Method and System for Boost Pressure Control," U.S. Appl. No. 15/160,880, filed May 20, 2016, 51 pages.
Xiao, B. et al., "Method and System for Boost Pressure Control," U.S. Appl. No. 15/474,868, filed Mar. 30, 2017, 78 pages.

* cited by examiner

METHOD AND SYSTEM FOR BOOSTED ENGINE SYSTEM

FIELD

The present description relates generally to methods and systems for improving transient response in a boosted engine system.

BACKGROUND/SUMMARY

Engines may be configured with boosting devices, such as turbochargers or superchargers, to increase mass airflow into a combustion chamber. Turbochargers and superchargers compress intake air entering the engine using an intake compressor. While a turbocharger includes a compressor that is driven by a turbine, a supercharger includes a compressor that is driven by the engine, or by a motor. In some engine systems, one or more intake charging devices may be staged in series or parallel to improve engine boost response.

One example of a multi-staged boosted engine is shown by Kawamura et al. in U.S. Pat. No. 6,938,420. Therein, an electric supercharger driven by an electric motor and an electric supercharger bypass valve (ESBV) are staged downstream of a turbocharger. During conditions when the turbocharger compressor is not spun up, the ESBV may be closed and the electric supercharger may be rotated to provide a transient positive boost pressure in order to reduce turbo lag. Then, when the turbocharger compressor is sufficiently spun up, the ESBV may be opened and the electric supercharger may be disabled, allowing the turbocharger to provide the desired boost pressure.

However the inventors herein have identified potential issues with such an approach. As one example, during selected vehicle maneuvers, such as cornering maneuvers, sliding maneuvers, maneuvers on sand or snow, etc., a larger amount of traction torque may be selectively added to front or rear tires. Typically, before such maneuvers, the vehicle may have undergone a deceleration event where vehicle brakes were applied and the acceleration pedal was released. Responsive to the deceleration event, engine actuators may have been adjusted to reduce boost pressure and move away from positions of best volumetric efficiency. For example, boost pressure may have been dumped by recirculating boosted air to a compressor inlet to mitigate surge, and an exhaust waste-gate may have been opened to decelerate a turbocharger turbine. As a result, when the driver tips back in shortly after the tip-out event, there is a perceptible transient torque deficiency which strongly affects the vehicle's maneuverability. A similar transient torque deficiency may occur when a vehicle launch is requested shortly after a deceleration event. Therein, the transient peak acceleration at the time of the vehicle launch (e.g., during the first second) may be limited, reducing the quality of the vehicle launch and driver satisfaction. Further, there may be NVH issues, such as a whoosh, experienced at the tip-in that degrades drivability. If boost pressure is reduced to address the tip-in whoosh, engine performance may be compromised.

In one example, the above issues may be at least partly addressed by a method for an engine comprising: responsive to a decrease in operator torque demand, fully closing each of an exhaust waste-gate valve coupled to a turbocharger turbine, a recirculation valve coupled to a turbocharger compressor, and a bypass valve coupled to a supercharger compressor staged upstream of the turbocharger compressor; fully opening an intake throttle valve; and actuating an electric motor coupled to the supercharger compressor. In this way, torque can be provided as soon as a tip-in happens.

As an example, an operator may select a performance mode of a boosted vehicle (e.g., via a button) wherein the performance mode is geared to a specific terrain or weather condition, such as a sand mode or baja mode or snow mode. Responsive to the selection, one or more traction control settings of the vehicle may be adjusted to improve traction for the corresponding terrain. In addition, to improve the power output and boosted engine response of the vehicle in the selected performance mode, boost actuator settings may be adjusted. For example, when the operator tips in, an exhaust waste-gate valve may be actuated closed to expedite spinning of a turbocharger turbine. While the turbocharger compressor spins up, transient boost pressure requirements may be met using an electric motor coupled to a supercharger compressor positioned upstream of the turbocharger compressor in the engine intake. Responsive to an operator pedal tip-out, including on a closed pedal event, boost actuators may be positioned to continue providing boost. For example, the exhaust waste-gate valve may be kept fully closed to continue spinning the turbine, a recirculation valve coupled to the turbocharger compressor may be held fully closed to continue spinning the compressor, and an intake throttle may be held fully open to increase airflow to the engine. Further, the electric motor may be actuated (e.g., to 100% duty cycle) to accelerate the supercharger compressor. Engine torque may be reduced responsive to the drop in operator torque demand by disabling cylinder fueling. As a result of the adjustment to the air path actuators, manifold pressure may be kept elevated (e.g., above barometric pressure) even as the engine torque output is reduced. As a result, when the operator subsequently tips in, more torque may be provided as soon as it is demanded. In addition, the boost response on the tip-in may be improved.

In comparison, when the operator does not select the performance mode, responsive to the tip-out, the exhaust waste-gate valve may be opened to rapidly spin down the turbine, the recirculation valve may be opened to rapidly spin down the compressor, and the intake throttle opening may be reduced to decrease airflow to the engine. Further, the electric motor may be maintained disabled and cylinder fueling may be disabled. As a result of the adjustments, manifold pressure may be rapidly dropped to barometric pressure conditions while the engine torque output is reduced. On the subsequent tip-in, the boost response may be slower, but that may be acceptable when not operating in the performance mode.

In this way, engine torque and boost response may be improved when an operator is performing selected vehicle maneuvers. By holding an exhaust waste-gate valve and an intake compressor recirculation valve closed during selected performance modes, irrespective of whether an operator torque demand increases or decreases, an intake manifold pressure (e.g., upstream of an intake throttle) may be maintained elevated. Consequently, when there is a sudden increase in torque demand, boost pressure can be rapidly provided and engine torque can be rapidly increased. This allows a tip-in torque demand to be met as soon as it is demanded, improving vehicle maneuverability during the execution of the various vehicle maneuvers. In addition, vehicle launch times may be reduced, especially when a vehicle launch is requested shortly after a deceleration event. Furthermore, NVH issues associated with tip-in whoosh can be reduced without compromising engine performance. Overall, vehicle drivability is enhanced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
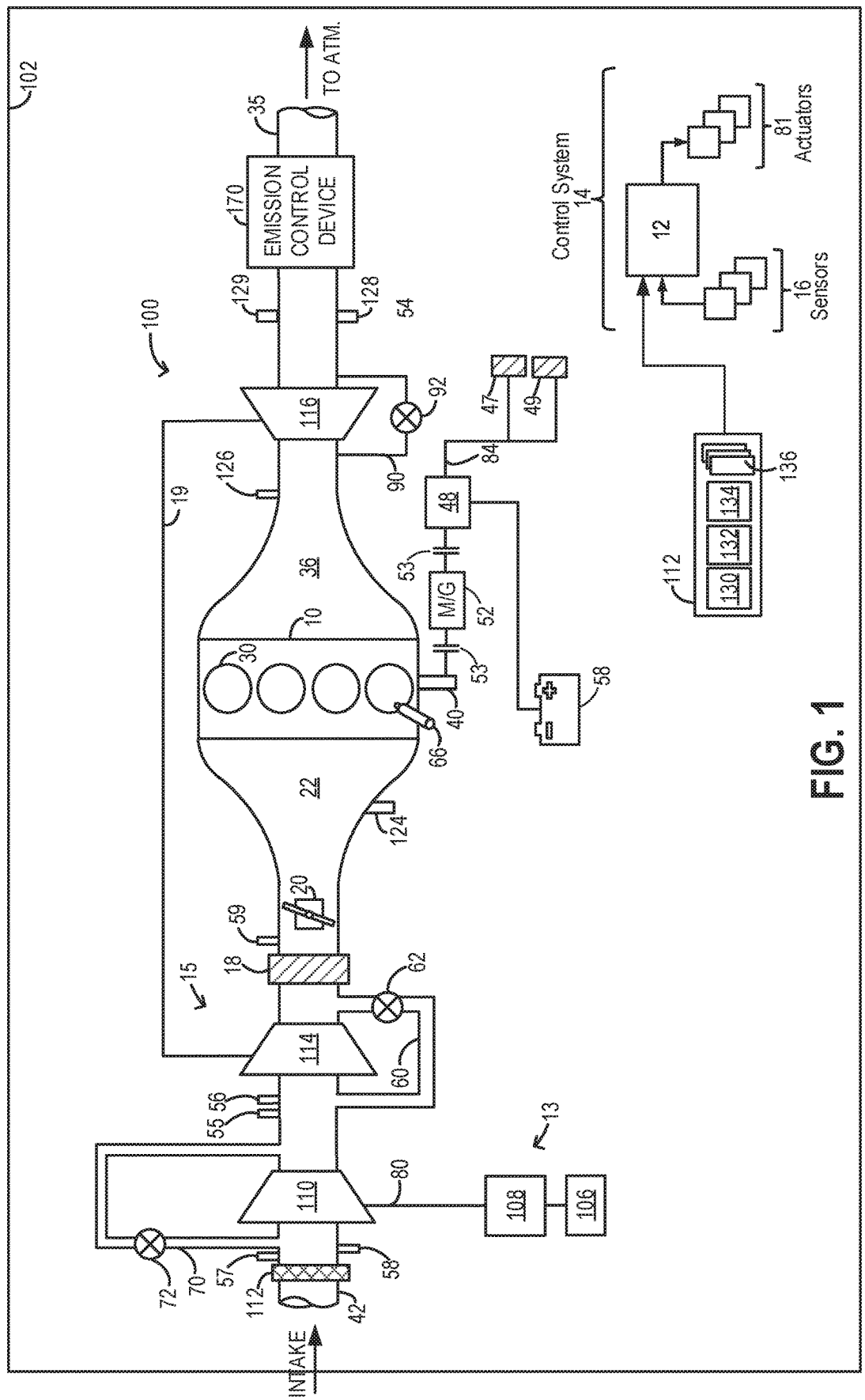
FIG. 1 shows an example embodiment of a boosted engine system having multiple staged charge boosting devices.

The following description relates to systems and methods for improving transient boost response during the execution of vehicle maneuvers in an engine system having staged boosting devices, such as in the boosted engine system of FIG. 1. A controller may be configured to perform a control routine, such as the example routines of FIGS. 2-4, to adjust air path and engine torque actuator settings based on an operator selected performance mode so as to improve torque response during the various vehicle maneuvers. A prophetic engine operation is shown with reference to FIGS. 5-6. By adjusting actuator settings to enable manifold pressure to be maintained elevated over barometric pressure independent of changes (e.g., increases or decreases) in torque demand, engine torque response is improved, enhancing vehicle drivability in the various performance modes.

FIG. 1 schematically shows aspects of an example engine system 100 including an engine 10 coupled in vehicle 102. In some examples, vehicle 102 may be a hybrid vehicle with multiple sources of torque available to one or more vehicle wheels 47, 49. In other examples, vehicle 102 is a conventional vehicle with only an engine, or an electric vehicle with only electric machine(s). In the example shown, vehicle 102 includes engine 10 and an electric machine 52. Electric machine 52 may be a motor or a motor/generator. Engine 10 and electric machine 52 are connected via a transmission 54 to vehicle wheels 47, 49 when one or more clutches 53 are engaged. In the depicted example, a first clutch 53 is provided between engine 10 and electric machine 52, and a second clutch 53 is provided between electric machine 52 and transmission 48. Controller 12 may send a signal to an actuator of each clutch 53 to engage or disengage the clutch, so as to connect or disconnect engine 10 from electric machine 52 and the components connected thereto, and/or connect or disconnect electric machine 52 from transmission 48 and the components connected thereto. Transmission 48 may be a gearbox, a planetary gear system, or another type of transmission. The powertrain may be configured in various manners including as a parallel, a series, or a series-parallel hybrid vehicle. Electric machine 52 receives electrical power from a traction battery 58 to provide torque to vehicle wheels 47, 49. Electric machine 52 may also be operated as a generator to provide electrical power to charge battery 58, for example during a braking operation.

In the depicted embodiment, engine 10 is a boosted engine including multiple, staged boosting devices. Specifically, engine 10 includes a first boosting device 13 staged upstream of a second boosting device 15. The configuration results in a first compressor 110 (of the first boosting device) being positioned in the engine intake passage 42 upstream of a second compressor 114 (of the second boosting device). In the present example, the first boosting device is an electric supercharger 13, while the second boosting device is a turbocharger 15.

Electric supercharger 13 includes first compressor 110 driven by electric motor 108. Specifically, the compressor fan is driven by power received from the electric motor along supercharger compressor shaft 80. Motor 108 is powered by an on-board energy storage device, such as system battery 106. Air compressed by first compressor 110 is then delivered to second compressor 114. Fresh air received at the compressor inlet of second compressor 114 is then introduced into engine 10. During selected conditions, air may bypass supercharger 15 and be directed through first compressor bypass 70 by adjusting the opening of an electric supercharger bypass valve (ESBV) 72. During these conditions, compressed air may be delivered to engine 10 via second compressor 114 of the turbocharger only. In some examples, first compressor 110 of supercharger 15 may additionally be driven by the engine crankshaft, via a clutch and gear mechanism.

Turbocharger 15 includes second compressor 114 driven by a turbine 116. Second compressor 114 is shown as a turbocharger compressor mechanically coupled to turbine 116 via a shaft 19, the turbine 116 driven by expanding engine exhaust. In one embodiment, the turbocharger may be a twin scroll device. In another embodiment, the turbocharger may be a variable geometry turbocharger (VGT), where turbine geometry is actively varied as a function of engine operating conditions. Fresh air is introduced along intake passage 42 into engine 10 via air cleaner 112 and flows to second compressor 110. During selected conditions, as elaborated below, air compressed by turbocharger 13 may be recirculated from the outlet to the inlet of compressor 114 through second compressor passage 60 by adjusting the opening of a compressor recirculation valve (CRV) 62. CRV 62 may be a continuously variable valve and increasing the opening of the recirculation valve may include actuating (or energizing) a solenoid of the valve.

One or both of valves 62 and 72 may be continuously variable valves wherein a position of the valve is continuously variable from a fully closed position to a fully open position. Alternatively, compressor recirculation valve 62 may be a continuously variable valve while compressor bypass valve 72 is an on-off valve. In some embodiments, CRV 62 may be normally partially open during boosted engine operation to provide some surge margin. Herein, the partially open position may be a default valve position. Then, in response to the indication of surge, the opening of CRV 62 may be increased. For example, the valve(s) may be shifted from the default, partially open position towards a fully open position. A degree of opening of the valve(s) during those conditions may be based on the indication of surge (e.g., the compressor ratio, the compressor flow rate, a pressure differential across the compressor, etc.). In alternate examples, CRV 62 may be held closed during boosted engine operation (e.g., peak performance conditions) to improve boost response and peak performance.

Second compressor 114 is coupled, through charge-air cooler (CAC) 18 (herein also referred to as an intercooler) to throttle valve 20. Throttle valve 20 is coupled to engine intake manifold 22. Air is received at the second compressor from first compressor 110. From the second compressor, the compressed air charge flows through the charge-air cooler 18 and the throttle valve to the intake manifold. The charge-air cooler may be an air-to-air or water-to-air heat exchanger, for example. In the embodiment shown in FIG. 1, the pressure of the air charge within the intake manifold is sensed by manifold air pressure (MAP) sensor 124.

It will be appreciated that, as used herein, first compressor refers to the upstream of the staged compressors and second compressor refers to the downstream of the staged compressors. In one non-limiting example, as depicted, the second downstream compressor is a turbocharger compressor while the first upstream compressor is a supercharger compressor. However, other combinations and configurations of boosting devices may be possible.

As such, engine torque may be transferred to vehicle wheels 47, 49 via powertrain shaft 84. Specifically, engine torque may be relayed from crankshaft 40 to transmission 48, and thereon to wheels 47, 49. Transmission 48 may be a fixed ratio transmission including a plurality of gear ratios to allow engine 10 to rotate at a different speed than wheels 47, 49. A clutch (not shown) may be provided between engine crankshaft 40 and transmission 48. By changing a torque transfer capacity of the clutch (e.g., an amount of clutch slippage), an amount of engine torque relayed to the wheels via the powertrain shaft may be modulated. For example, during specific vehicle driving maneuvers (such as when drifting, turning, swerving, etc.) as well as when driving the vehicle on specific terrains (such as on snow or sand), as elaborated below, torque may be differentially transferred to wheels 47 relative to wheels 49. In one example, wheels 47 may be front wheels of the vehicle while wheels 49 are rear wheels. In another example, wheels 47 may be left side wheels of the vehicle while wheels 49 are right side wheels. In addition to using torque actuators to modulate the torque disseminated to the wheels, one or more traction control settings may also be varied.

A vehicle operator may select a performance mode for operating vehicle 102 by actuating one of a plurality of performance mode buttons 130-136 provided on a vehicle display 112 (or on a vehicle dashboard). In another example, the plurality of performance mode buttons 130-136 may be provided on a dial on the vehicle's dashboard. The different performance modes may enable vehicle settings to be configured to improve the performance of selected vehicle maneuvers. Additionally or alternatively, the different performance modes may enable vehicle settings to be configured to improve the maneuverability and driveability of vehicle 102 on selected terrains. It will be appreciated that if none of the performance mode buttons are actuated, the vehicle may operate in a default ("normal") mode where the vehicle settings are maintained at a default configuration. As an example, the operator may select a snow mode 130 to improve vehicle driveability on snow or in icy conditions. Example vehicle setting adjustments performed in the snow mode include the transmission being operated in a higher gear ratio (such as when starting the engine). In addition, traction control settings, including yaw control settings, may be adjusted to a snow mode calibration that enables torque slip targets to be varied based on accelerator pedal position.

As another example, the operator may select a sand mode (or mud mode) wherein vehicle response is tubed for optimum traction and maintenance of momentum in deep deformable surfaces, such as deep loose sand or mud. Example vehicle setting adjustments performed in the sand mode include the transmission being operated to enable fast, crisp shifts and to further enable the vehicle to react to high G force inputs from the vehicle operator, such as by holding the transmission in gear longer and allowing for aggressive gear downshifts. In addition, a turbocharger may be kept spooled longer, engine idling speeds may be raised and throttle response to a torque demand may be increased. As another example, traction control settings, including yaw control settings, may be adjusted to a sand mode calibration that improves vehicle performance on deep deformable surfaces, such as mud ruts. For example, engine traction slip targets may be desensitized. As yet another example, the operator may select a "baja" mode 132 to improve vehicle drivability during high speed off road performance, such as on rugged terrains with low ambient humidity. Example vehicle setting adjustments performed in the baja mode include the transmission being operated in a higher gear ratio for longer durations, operating the engine at higher speeds, upshifting transmission gears earlier, holding the transmission in gear longer, enabling more aggressive downshifts, and adjusting throttle settings to allow for a more linear power delivery. Furthermore, powertrain cooling may be provided more aggressively. In addition, traction control settings may be adjusted to optimize vehicle acceleration and stability. As also detailed with reference to FIGS. 2-3, air path and boost actuator settings may be adjusted to maintain manifold pressure elevated, while changes in torque demand are met via fueling adjustments.

As yet another example, the operator may select a "drift" mode 134 to enable an operator to better perform drifting or sliding maneuvers. When operating in the drift mode, at least the rear wheels of the vehicle may be driving the vehicle and slipping. Additionally, the front wheels may also be slipping. However, traction control may not be activated despite the slipping of the rear wheels. Likewise, stability control settings may not be activated in response to the wheels slipping, and therefore may not be braking the rear wheels. In addition, the vehicle may be yawing. Example vehicle setting adjustments performed in the drift mode include the transmission being operated in the higher gear ratio, and traction control settings being adjusted to enable torque vectoring with torque being biased towards the vehicle's rear wheels and one of the left and right side wheels. As also detailed with reference to FIGS. 2 and 4, boost actuator settings may be adjusted to maintain manifold pressure elevated, while changes in torque demand are met via spark and throttle adjustments. Other performance modes 136 that may be selected include, as non-limiting examples, vehicle launch mode, sport mode, mud mode, rock crawl mode, different weather modes, etc., each including distinct settings for transmission, throttle response, steering feel, electronic locking differential, stability and traction control, etc.

Intake manifold 22 is coupled to a series of combustion chambers 30 through a series of intake valves (not shown). The combustion chambers are further coupled to exhaust manifold 36 via a series of exhaust valves (not shown). In the depicted embodiment, a single exhaust manifold 36 is shown. However, in other embodiments, the exhaust manifold may include a plurality of exhaust manifold sections. Configurations having a plurality of exhaust manifold sections may enable effluent from different combustion chambers to be directed to different locations in the engine system.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as needed for desired combustion and emissions-control performance. For example, the cam timing may be adjusted via a variable cam timing system to move the intake and exhaust cams to a position that provides the best volumetric efficiency for the given operating conditions.

Combustion chambers 30 may be supplied one or more fuels, such as gasoline, alcohol fuel blends, diesel, biodiesel, compressed natural gas, etc. Fuel may be supplied to the combustion chambers via direct injection, port injection, throttle valve-body injection, or any combination thereof. In the combustion chambers, combustion may be initiated via spark ignition and/or compression ignition.

As shown in FIG. 1, exhaust from the one or more exhaust manifold sections is directed to turbine 116 to drive the turbine. When reduced turbine torque is desired, some exhaust may be directed instead through waste-gate 90, by-passing the turbine. Wastegate actuator 92 may be actuated open to dump at least some exhaust pressure from upstream of the turbine to a location downstream of the turbine via wastegate 90. By reducing exhaust pressure upstream of the turbine, turbine speed can be reduced.

The combined flow from the turbine and the wastegate then flows through emission control 170. In general, one or more emission control devices 170 may include one or more exhaust after-treatment catalysts configured to catalytically treat the exhaust flow, and thereby reduce an amount of one or more substances in the exhaust flow. For example, one exhaust after-treatment catalyst may be configured to trap $NO_x$ from the exhaust flow when the exhaust flow is lean, and to reduce the trapped $NO_x$ when the exhaust flow is rich. In other examples, an exhaust after-treatment catalyst may be configured to disproportionate $NO_x$ or to selectively reduce $NO_x$ with the aid of a reducing agent. In still other examples, an exhaust after-treatment catalyst may be configured to oxidize residual hydrocarbons and/or carbon monoxide in the exhaust flow. Different exhaust after-treatment catalysts having any such functionality may be arranged in wash coats or elsewhere in the exhaust after-treatment stages, either separately or together. In some embodiments, the exhaust after-treatment stages may include a regeneratable soot filter configured to trap and oxidize soot particles in the exhaust flow.

All or part of the treated exhaust from emission control 170 may be released into the atmosphere via exhaust conduit 35. Depending on operating conditions, however, some exhaust may be diverted instead to the intake passage via an EGR passage (not shown) including an EGR cooler and an EGR valve. EGR may be recirculated to the inlet of first compressor 110, second compressor 114, or both.

One or more sensors may be coupled to an inlet of second compressor 114 (as shown) and/or first compressor 110 (not shown). For example, a temperature sensor 55 may be coupled to the inlet for estimating a compressor inlet temperature. As another example, a pressure sensor 56 may be coupled to the inlet for estimating a pressure of aircharge entering the compressor. Still other sensors may include, for example, air-fuel ratio sensors, humidity sensors, etc. In other examples, one or more of the compressor inlet conditions (such as humidity, temperature, etc.) may be inferred based on engine operating conditions. The sensors may estimate a condition of the intake air received at the compressor inlet from the intake passage as well as the aircharge recirculated from upstream of the CAC. One or more sensors may also be coupled to intake passage 42, upstream of compressor 110, for determining a composition and condition of aircharge entering the compressor. These sensors may include, for example, manifold air flow sensor 57, and a barometric pressure sensor 58. In addition, a throttle inlet pressure (TIP) sensor 59 may be coupled downstream of the CAC and upstream of throttle 20 for estimating a boost pressure delivered to the engine.

During an operator tip-in event, when going from engine operation without boost to engine operation with boost responsive to an increase in operator torque demand, turbo lag can occur. This is due to delays in turbine spin-up and reduced flow through second compressor 114 when the throttle opens at the tip-in. The same may also occur when the engine is operating boosted and there is a transient increase in boost demand due to an increase in accelerator pedal application by the vehicle operator. To reduce this turbo lag, during those selected conditions, both supercharger 13 and turbocharger 15 may be enabled. Specifically, responsive to the tip-in, the waste-gate actuator 92 may be closed (e.g., fully closed) to increase exhaust flow through turbine 116. While turbine 116 spins-up, boost pressure can be transiently provided by upstream supercharger compressor 110. Enabling the supercharger includes drawing energy from battery 106 to spin motor 108, to thereby accelerate first compressor 110. In addition, bypass valve 72 may be closed (e.g., fully closed) so as to enable a larger portion of intake air to be flowed through and compressed by first compressor 110. In addition, CRV 62 may be closed (e.g., fully closed) so as to increase flow through downstream second compressor 114. When the turbine has sufficiently spun up, and is capable of driving second compressor 114, the first compressor may be decelerated by disabling motor 108 (by discontinuing flow of electrical energy to the motor from the battery 106). In addition, bypass valve 72 may be opened so as to enable a larger portion of air to bypass first compressor 110.

During an operator tip-out event, when going from engine operation with boost to engine operation without boost, or reduced boost, compressor surge can occur. This is due to a decreased flow through the second compressor 114 when the throttle closes at the tip-out. The reduced forward flow through the second compressor can cause surge and degrade turbocharger performance. In addition, surge can lead to NVH issues such as undesirable noise from the engine intake system. To enable the torque demand to be rapidly reduced responsive to the tip-out without incurring compressor surge during a default mode of vehicle operation, at least a portion of the aircharge compressed by second compressor 114 may be recirculated to the compressor inlet. This allows excess boost pressure to be substantially immediately relieved. In particular, compressor recirculation valve 62 may be opened to recirculate (warm) compressed air from the compressor outlet of second compressor 114, upstream of charge-air cooler 18 to the compressor inlet of second compressor 114. In some embodiments, the compressor recirculation system may alternatively, or additionally, include a recirculation passage for recirculating (cooled) compressed air from the compressor outlet, downstream of the charge-air cooler to the compressor inlet. In addition, waste-gate actuator 92 may be moved to a more open (e.g., fully open) position so that more of the exhaust flow travels to the tailpipe while bypassing the turbine, thereby expediting turbine spin-down.

However the inventors herein have recognized that when operating in some or all of the performance modes, there may be a transient torque deficiency that is not addressed with the above-described adjustments. For example, during cornering, sliding, or drifting maneuvers, or when maneuvering on sand, a vehicle operator may use the acceleration pedal to turn the vehicle by adding traction torque to the rear tires and break the traction limit. Before the maneuver, the vehicle usually goes through a deceleration event when the brake is applied and acceleration pedal is released. In the default mode, responsive to the deceleration event, the engine throttle opening is decreased, the CRV is opened to dump the boost pressure, the waste-gate valve is opened to reduce exhaust backpressure, and variable cam timing (VCT) adjustments are performed to move the intake and exhaust cams away from a position of best volumetric efficiency. These adjustments may enable the torque to be reduced, increase a margin to compressor surge, and reduce NVH issues when the vehicle is subsequently tipped in, such as to reduce tip-in whoosh. However, as a result of the adjustments, when the operator tips back in from the tip-out to perform a vehicle maneuver, there is a transient torque deficiency that strongly affects the vehicle's maneuverability. Likewise, during vehicle launch conditions, the transient peak acceleration may be affected, and the driver may not perceive it. As elaborated with reference to FIGS. 2-4, when a performance mode is selected by an operator (such as by actuating one of buttons 130-136 on the vehicle display), engine actuator settings may be adjusted to reduce the transient torque deficiency. In particular, independent of the torque demand, including on a tip-out or deceleration event, the waste-gate valve and the CRV may be held closed, the electric motor coupled to the supercharger compressor may be kept actuated and enabled, and the intake and exhaust cams may be maintained at a position of best volumetric efficiency. As a result, the throttle inlet pressure may be kept elevated (e.g., above barometric pressure). Any drop in torque demand may be provided via adjustments to one or more of intake throttle position, spark timing, and engine fueling, the adjustment provided selected based on the performance mode selection. Consequently, when the operator tips-in shortly after tipping out (or when the torque demand oscillates due to the specific vehicle maneuver), boost response is improved and operator torque demand can be met rapidly. The improvement in engine torque response improves vehicle maneuverability in the performance modes and allows for a quicker vehicle launch, when desired.

Engine system 100 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, MAP sensor 124, exhaust temperature sensor 128, exhaust pressure sensor 129, compressor inlet temperature sensor 55, compressor inlet pressure sensor 56, MAF sensor 57, BP sensor 58, and TIP sensor 59. Other sensors such as additional pressure, temperature, air/fuel ratio, and composition sensors may be coupled to various locations in engine system 100. The actuators 81 may include, for example, throttle 20, compressor recirculation valve 62, compressor bypass valve 72, electric motor 108, wastegate actuator 92, and fuel injector 66. The control system 14 may include a controller 12. The controller may receive input data from the various sensors, process the input data, and employ the various actuators based on the received signals and instructions stored on a memory of the controller. The controller may employ the actuators in response to the processed input data based on instruction or code programmed therein corresponding to one or more routines, such as example control routines described herein with regard to FIGS. 2-4. For example, responsive to an operator tip-out event in a (first) performance mode, the controller may send a signal to a cylinder fuel injector to temporarily disable fuel injection. As another example, responsive to an operator tip-out event in a (second) performance mode, the controller may send a signal to a cylinder spark plug to retard spark timing. As yet another example, responsive to an operator tip-out event in a default (non-performance) mode, the controller may send a signal to each of a CRV actuator and a waste-gate actuator to move the CRV and the waste-gate valve towards a more open position.

In this way, the components of FIG. 1 enables a vehicle system comprising an engine having an intake; a first intake compressor driven by an electric motor; a second intake compressor driven by an exhaust turbine positioned downstream of the first compressor along the intake; an intake throttle coupled downstream of the second compressor; a waste-gate including a waste-gate valve coupled across the exhaust turbine; a first compressor bypass including a first valve coupled across the first compressor; a second compressor passage including a second valve coupled across the second compressor; a fuel injector coupled to each cylinder of the engine; a pressure sensor for estimating a manifold pressure at an inlet of the intake throttle; a vehicle display including a plurality of operator selectable buttons; and a controller. The controller may be configured with computer readable instructions stored on non-transitory memory for: transitioning the engine to one of a sand or baja mode based on an operator selection received via the vehicle display; and in response to a decrease in operator demanded torque while in the sand or baja mode, maintaining manifold pressure above barometric pressure by fully closing each of the waste-gate valve, the first valve, and the second valve, fully opening the intake throttle, and actuating the electric motor to a full duty cycle. The controller may include further instructions for, disabling the fuel injector coupled to a number of cylinders, the number of cylinders selected increased as the operator demanded torque decreases. The controller may include still further instructions for: maintaining the engine in a default mode in response to absence of operator selection; and in response to a decrease in operator demanded torque while in the default mode, reducing manifold pressure to barometric pressure by increasing an opening of each of the waste-gate valve, the first valve, and the second valve, while reducing the opening of the intake throttle, and disabling the electric motor to a zero duty cycle.

Figure 2:
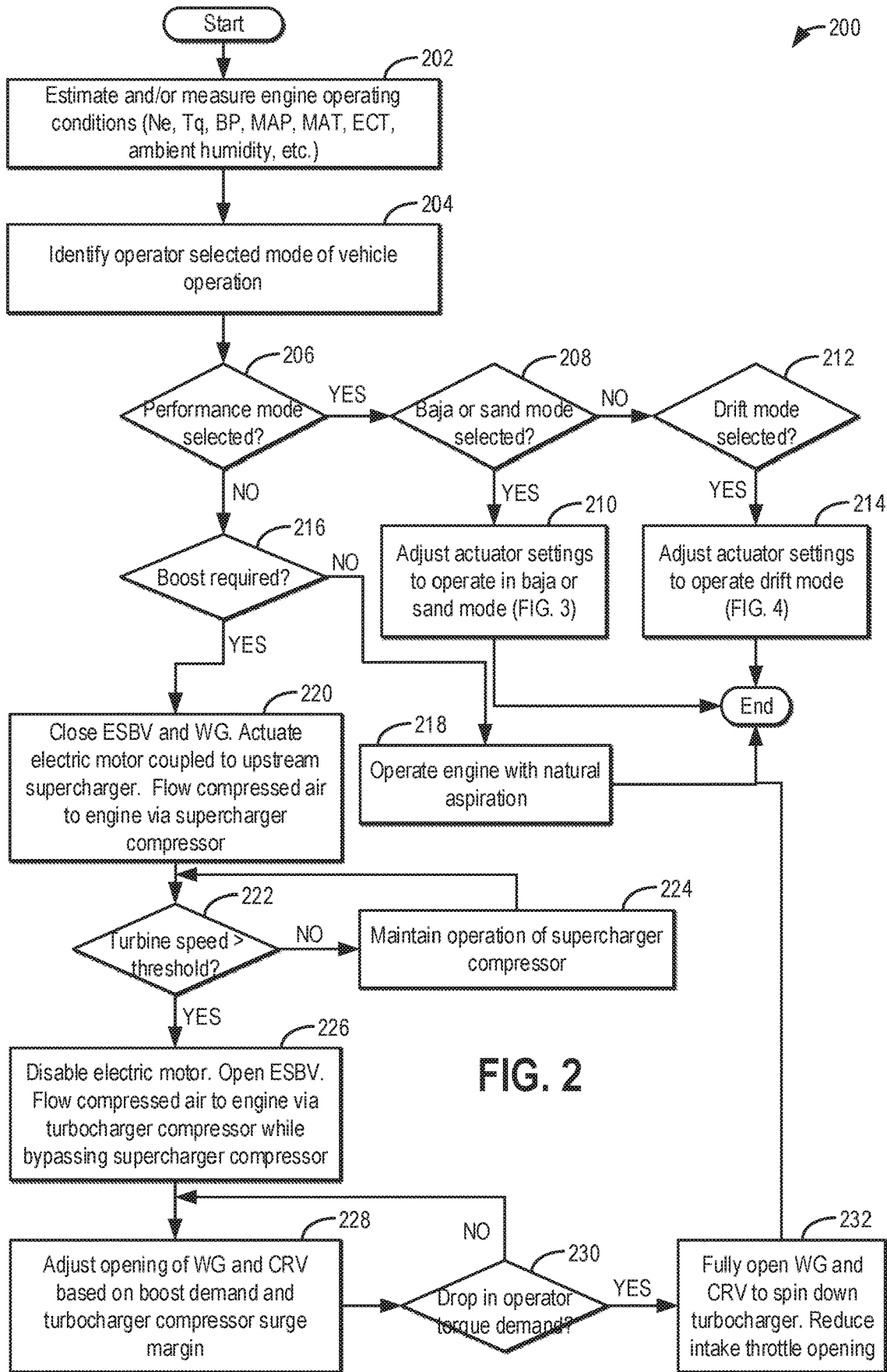
FIG. 2 shows a high level flowchart illustrating a routine that may be implemented to operate a boosted engine system including an electric supercharger and a turbocharger.

Turning now to FIG. 2, an example routine 200 is shown for operating a boosted engine having staged intake charging devices. Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 202, the method includes estimating engine operating conditions, such as engine speed, pedal position, operator torque demand, ambient conditions (ambient temperature, pressure, humidity), engine temperature, etc. At 204, the method includes identifying an operator selected mode of vehicle operation. For example, it may be determined if the vehicle operator has selected a performance mode by pressing a button on the vehicle display (or dashboard). If a selection has been made, the selection may be retrieved. Else, if no selection has been mode, a default mode of vehicle operation may be presumed.

At 206, it may be confirmed that a performance mode was selected. A driver selected performance mode may include one of operating the vehicle on a selected terrain or in a selected weather conditions, and operating the vehicle with selected maneuvers (such as sliding or cornering maneuvers). If a performance mode was selected, at 208, the method includes confirming that a baja or sand mode was selected. The sand mode may be a performance mode where the driver intends to drive the vehicle on sandy terrain. The baja mode may be a performance mode where the driver intends to drive the vehicle on rocky terrain and in the presence of low ambient humidity. If yes, then at 210, engine actuator settings may be adjusted to operate the vehicle in the sand or baja mode. The actuator setting adjustments for the sand or baja mode are elaborated with reference to FIG. 3. If a sand or baja mode was not selected, at 212, the method includes confirming that a drift mode was selected. The drift mode may be a performance mode where the driver intends to perform sliding maneuvers with the vehicle. If the drift mode is selected, then at 214, engine actuator settings may be adjusted to operate the vehicle in the drift mode. The actuator setting adjustments for the drift mode are elaborated with reference to FIG. 4. The method then exits.

If a performance mode was not selected, then a default mode of vehicle operation may be maintained and actuator settings corresponding to the default mode may be maintained. At 216, the method includes determining if boost is required. In one example, boost may be required at mid-high engine loads. In another example, boost may be required in response to an operator pedal tip-in or increase in driver torque demand. If boost is not required, such as when the engine load is low or the driver torque demand is low, the method moves to 218 wherein the engine is operated in the default mode with natural aspiration. The method then exits.

If boost is required, then at 220, the method includes closing each of an exhaust waste-gate valve (such as waste-gate valve 92 of FIG. 1) and an electric supercharger bypass valve (such as ESBV 72 of FIG. 1). By closing the waste-gate valve, exhaust flow through the turbocharger turbine is increased, expediting turbine spin-up. By closing the bypass valve coupling the supercharger compressor to the intake passage, intake air flow through the supercharger compressor is increased, expediting boost pressure build-up. Optionally, an intake compressor recirculation valve (such as CRV 62 of FIG. 1) may also be closed so that pressure loss across the turbocharger compressor is reduced. In one example, the ESBV, the CRV, and the waste-gate valve are moved to fully closed positions responsive to signals commanded by the controller to corresponding valve actuators. Alternatively, the ESBV, CRV, and the waste-gate valve may be moved to a more closed position that enables the turbine to spin-up while maintaining sufficient margin to surge for the supercharger and turbocharger compressors.

Also at 220, the method includes actuating the electric motor coupled to the upstream supercharger compressor thereby enabling the first, upstream compressor while the turbine coupled to the second, downstream compressor spins up. Herein, in response to an increase in driver demanded torque, the first compressor is accelerated and the flow of compressed air to the engine is increased. Herein the first compressor is staged upstream of the s compressor along an air intake passage, the first compressor driven by an electric motor while the second compressor is driven by an exhaust turbine. Accelerating the first compressor includes spinning the first compressor via the electric motor using power drawn from a battery. For example, the first compressor may be spun by adjusting an electromechanical actuator coupled to an electric motor of the supercharger to rotate the motor at a higher speed by sending a duty cycle control signal from the controller to the actuator. In one example, the controller may send a signal to the actuator to operate the electric motor at a full (e.g., 100%) duty cycle, thereby enabling the supercharger compressor to be spun at a full speed. Alternatively, the second compressor may be accelerated at a speed based on the increase in boost demand. Thus, at this time, compressed air is provided to the engine via only the first compressor. As such, electric superchargers may have a response time (that is, idle to 100% duty cycle) of 130-200 ms and therefore may be able to deliver boost much faster compared to a typical turbocharger response time (1-2 second). Therefore, the first compressor of the electric supercharger may be able to fill the turbo lag significantly faster.

The operation of the electric motor coupled to the electric supercharger may be adjusted to maintain the manifold pressure (or throttle inlet pressure) elevated while avoiding a whoosh region. The inventors herein have recognized that due to compressor design constraints, there may be regions of marginal instability in a compressor map (wherein the pressure ratio across the compressor is mapped as a function of mass flow). In particular, at the left side of the map, where the slope of a constant compressor speed line transitions from negative to positive, a marginal instability occurs which can create an NVH error state called whoosh (or tip-in whoosh due to its effect being pronounced on tip-in events). As such, the whoosh condition (or whoosh region on the compressor map) is distinct from a compressor hard or sift surge condition (or surge region on the compressor map). In addition, the whoosh condition is an NVH error state that typically occurs on a tip-in while surge is an NVH error state that typically occurs on a tip-out. The higher noise caused during the whoosh conditions may be objectionable to a vehicle operator. To reduce the tip-in whoosh (or wholly avoid it), a (turbocharger) compressor pressure ratio may need to be lowered at the time of a tip-in. However such a lowering of the pressure ratio can reduce boosted engine output and sacrifice vehicle drivability. Therefore, to raise the throttle inlet pressure while increasing a margin to the compressor whoosh region, the controller may adjust the duty cycle of the electric motor coupled to the upstream supercharger compressor to increase the downstream turbocharger compressor inlet pressure (CIP), thereby reducing the effective pressure ratio across the turbocharger compressor. This adjustment may alter the trajectory on the turbocharger compressor map such that the margin to the whoosh region is increased.

Also at 220, intake and exhaust cams may be actuated to positions that provide the highest volumetric efficiency responsive to signals commanded by the controller to a variable cam timing system. By placing the intake and exhaust cams at the position of highest volumetric efficiency for the given engine operating conditions, the amount of airflow directed to engine cylinders may be increased, improving boost response.

As exhaust heat and pressure develops due to cylinder combustion, the exhaust turbine speed increases, driving the second compressor. At 222, it is determined if the turbine speed is higher than a threshold, such as above a threshold where the turbocharger is able to drive the second compressor and sustain the boost demand. If not, operation of the first compressor (of the supercharger) is maintained at 224.

If turbine speed is higher than the threshold, then at 226, the method includes decelerating the first compressor by disabling the electric motor, for example based on a signal sent from the controller to an electromechanical actuator of the motor that reduces motor rotation speed. Additionally, the ESBV may be opened allowing intake air to flow to engine via the second compressor (of the turbocharger), while bypassing the first compressor (of the supercharger). Specifically, an electromechanical actuator coupled to the bypass valve in the bypass across the first compressor may be adjusted to rotate the bypass valve to a more open position responsive to a control signal from the controller to the actuator. Thus, after the turbine has spun up sufficiently, the method includes bypassing the first, upstream compressor and providing a flow of compressed air to a piston engine via the second, downstream compressor. At this time, compressed air is not provided to the engine via the first compressor. In this way, by transiently operating the first compressor of the supercharger until the turbocharger turbine is spun up, turbo lag due to delays in spinning up the turbocharger turbine are reduced.

At 228, the method includes adjusting the opening of the waste-gate valve and the CRV based on boost demand and further based on turbocharges compressor margin to surge. For example, responsive to the elevated torque demand, the controller may send a signal to maintain the waste-gate valve and the CRV closed. Alternatively, after the turbine has spun-up, the waste-gate valve may be moved to a slightly more open position so that turbine speed can be maintained while improving margin to surge (in case of a sudden tip-out or deceleration event). Likewise, after the turbine has spun-up, the CRV may be moved to a slightly more open position so that a pressure ratio across the turbocharger compressor can be maintained at a sufficient margin from a surge limit (in case of a sudden tip-out or deceleration event).

At 230, it may be determined if there is a drop in operator torque demand. In one example, there may be a drop in torque demand responsive to an operator pedal tip-out event, braking event, or deceleration event. In response to the tip-out event, at 232, the method includes fully opening the waste-gate valve to rapidly spin down the turbine. In addition, the CRV may be fully opened so as to dump boost pressure to a location upstream of the compressor. In addition, an intake throttle opening may be reduced so as to reduce air flow to the engine. Further, intake and exhaust cams may be moved away from the positions that provide the highest volumetric efficiency so that the intake air flow can be reduced. As a result of the air path and boost path actuator adjustments, boost pressure may be rapidly reduced to meet the lower torque demand. In addition, the manifold pressure may be reduced, for example, to barometric pressure conditions. For example, the manifold pressure may be rapidly reduced from ~40 inHg to 29 inHg. The method then exits.

Figure 3:
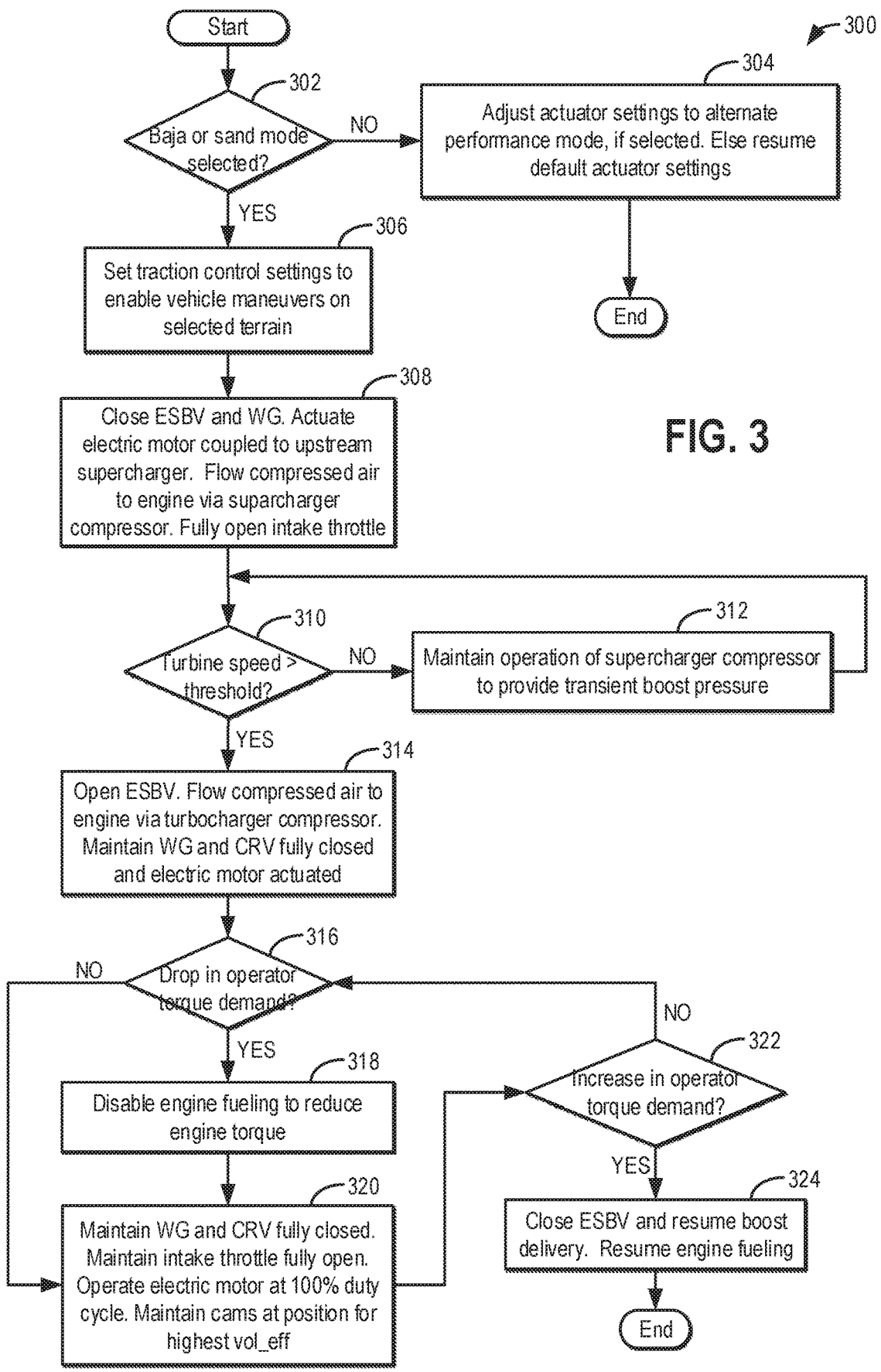
FIG. 3 shows a flowchart illustrating a routine that may be implemented to adjust engine torque actuator settings responsive to selection of a sand or baja mode.

Turning now to FIG. 3, an example method 300 is shown for adjusting boost and air path actuator settings responsive to an operator selection of a sand or baja mode. In one example, the method of FIG. 3 may be performed as part of the method of FIG. 2, such as at 210.

At 302, the method includes confirming that a sand or baja mode of vehicle performance has been selected. In one example, the selection is confirmed responsive to an operator actuating a sand or baja mode button on a vehicle display or dashboard. If the sand or baja mode selection is not confirmed, at 304, the method includes adjusting actuator settings to an alternate performance mode if an alternate performance mode (e.g., drift mode) was selected. Else, a default mode may be confirmed and default actuator settings may be maintained (or resumed).

If the sand or baja mode is selected, at 306, the method includes applying transmission and traction control settings that enable vehicle maneuvers on the selected terrain. For example, the transmission may be operated in a higher gear ratio for longer durations, the engine may be operated at higher engine speeds (e.g., higher engine idling speeds), transmission gears may be upshifted earlier, the engine may be started in a higher gear, the transmission may be held in gear longer, transmission downshifts may be enabled more aggressively, throttle settings may be adjusted to allow for a more linear power delivery, traction control settings, including yaw control settings, may be adjusted improve vehicle performance on deep deformable surfaces, and engine traction slip targets may be desensitized. Furthermore, powertrain cooling may be provided more aggressively.

Responsive to the selection of the baja mode, the engine is operated with boost to enable the vehicle maneuvers desired in the selected mode to be performed. That is, when a performance mode is selected, the engine is not operated with natural aspiration. Specifically at 308, the method includes closing each of the ESBV and the waste-gate valve. For example, both valves may be fully closed responsive to control signals received at corresponding actuators from the controller. Further, the intake throttle may be fully opened and the CRV may be fully closed. In addition, the controller may actuate the electric motor coupled to the first, upstream (supercharger) compressor by sending a signal to operate the electric motor at a higher duty cycle, such as at a 100% duty cycle. The duty cycle of the electric motor may be adjusted to operate the turbocharger compressor outside of the whoosh region. Consequently, air compressed by the supercharger compressor may be flowed to the engine while the turbocharger turbine spins up. By closing the ESBV and actuating the electric motor, the throttle inlet pressure may be raised. By closing the waste-gate valve and the CRV, turbine spin-up and turbocharger operation may be expedited.

Additionally, intake and exhaust cams may be actuated to positions that provide the highest volumetric efficiency responsive to signals commanded by the controller to a variable cam timing system. By placing the intake and exhaust cams at the position of highest volumetric efficiency for the given engine operating conditions, the amount of airflow directed to engine cylinders may be increased, improving boost response.

At 310, it may be determined if the turbine speed is higher than a threshold, such as above a threshold where the turbocharger is able to drive the second, downstream compressor and sustain the boost demand. If not, operation of the first compressor (of the supercharger) is maintained at 312 to transiently provide the required boost pressure.

If the turbine speed is above the threshold, then at 314, the method includes opening (e.g., fully opening) the ESBV so that air may flow to the downstream turbocharger compressor while bypassing the upstream supercharger compressor. However, the electric motor of the supercharger may be maintained activated (e.g., at the full duty cycle) and the supercharger compressor may be maintained spinning even though air may not flowing through the supercharger compressor (due to the ESBV being opened). In addition, even after the turbine speed has reached the threshold, the wastegate valve and the CRV may be held fully closed.

As such, during the sand or baja mode, as the vehicle is maneuvered on the sand terrain, the operator torque demand may continually vary. For example, prior to a cornering maneuver, the vehicle may be decelerated (e.g., the operator may fully tip out) and then accelerated immediately after (e.g., the operator may be then fully tip in). To enable the sudden changes in torque demand to be accommodated without degrading boost response when the operator tips-in, boost and air path actuator settings may be adjusted differently from the default mode of vehicle operation. In particular, at 316, it may be determined if there is a sudden drop in operator torque demand. In one example, a sudden drop in operator torque demand may occur when the operator tips out (e.g., prior to performing a vehicle maneuver). In another example, the decrease in operator torque demand is responsive to an operator pedal tip-out immediately following an operator pedal tip-in.

If a drop in operator torque demand is not confirmed, then the method moves directly to 320 to maintain the waste-gate valve and CRV fully closed, the intake throttle fully open, and the electric motor coupled to the supercharger compressor activated. Further, intake and exhaust cams are maintained at positions that provide the highest volumetric efficiency. If there is a drop in torque demand, at 318, the method includes reducing engine torque output based on the decreased operator torque demand by shutting off fuel to one or more engine cylinders. In particular, as the engine torque demand decreases, the number of cylinder fuel injectors that are deactivated may be increased. For example, engine torque may be reduced to zero torque (in accordance with a driver demand) by shutting off all engine fuel injectors. The controller may send a control signal to a fuel injector actuator of a cylinder, the control signal deactivating the fuel injector. The number of cylinders where fuel is deactivated may be based on the decrease in operator torque demand which is inferred from a measured accelerator pedal position or brake pedal position. The controller may determine the number of cylinders to send the deactivation control signal to through a determination that directly takes into account the accelerator pedal position, such as increasing the number of cylinders whose fuel is deactivated as the accelerator pedal position moves towards a released position. The controller may alternatively determine the number of cylinders to send the control signal to based on a calculation using a look-up table with the input being operator torque demand (or accelerator pedal position) and the output being number of cylinder fuel injectors to deactivate. As another example, the controller may make a logical determination (e.g., regarding a number of cylinder fuel injectors to disable) based on logic rules that are a function of the operator torque demand. The controller may then generate a control signal that is sent to one or more cylinder fuel injectors.

At 320, the method includes maintaining the wastegate and CRV fully closed, and the intake throttle fully open. In addition, the electric motor coupled to the supercharger compressor may continue to be operated (e.g., at 100% duty cycle). Further, intake and exhaust cams may be maintained at positions that provide the highest volumetric efficiency despite the drop in torque demand. By maintaining the position of the air path and boost actuators at a place where air flow to the engine is increased, intake manifold pressure (as inferred based on a measured MAP or measured throttle inlet pressure) may be maintained elevated, above barometric pressure (for example, at ~40 inHg instead of dropping to barometric pressure of 29 inHg), despite the drop in torque demand. As a result, independent of the change in torque demand, the manifold pressure is maintained elevated.

In this way, responsive to a decrease in operator torque demand, the controller may send a signal to fully closing each of an exhaust waste-gate valve coupled to a turbocharger turbine, a recirculation valve coupled to a turbocharger compressor, and a bypass valve coupled to a supercharger compressor staged upstream of the turbocharger compressor, while fully opening the intake throttle valve. In addition, the controller may actuate an electric motor coupled to the supercharger compressor, by commanding a full duty cycle to the electric motor. Further, the controller may adjust a variable cam timing to maintain intake and exhaust cams at a position for highest volumetric efficiency responsive to the decrease in operator torque demand. As a result, a throttle inlet pressure may be maintained above barometric pressure responsive to the decrease in operator torque demand.

It will be appreciated that the electric supercharger may be maintained activated with the electric motor operating at 100% duty cycle subject to hardware constraints and system capabilities. For example, in response to a decrease in a margin to surge for the supercharger compressor, such as may occur when the intake air flow to the engine exceeds the supercharger compressor's choke limit or when the pressure ratio across the supercharger compressor moves into a surge region of a compressor map, the supercharger compressor may be transiently deactivated. The supercharger compressor may be deactivated by transiently (or intermittently) opening the bypass valve (ESBV) coupling the supercharger compressor to the intake passage. Alternatively, the controller may disable the signal sent to the electric motor (that is, 0% duty cycle) or reduce the duty cycle of the electric motor (to a non-zero value). Then, once the margin to surge has improved, and the supercharger compressor has moved away from the choke limit, the supercharger compressor may be reactivated by returning the bypass valve to a fully closed position (or by resuming the 100% duty cycle signal sent to the electric motor). In another example, the supercharger compressor may be transiently deactivated responsive to a drop in the state of charge of the battery powering the electric motor (e.g., to below a threshold state of charge). While the supercharger is deactivated, the battery may be recharged, such as via regenerative braking or using engine torque (in excess of demanded torque). Then, once the battery is charged to above the threshold state of charge, the supercharger compressor may be reactivated by resuming the 100% duty cycle signal sent to the electric motor.

From 320, the method moves to 322 to determine if there is an increase in torque demand. In one example, a sudden increase in operator torque demand may occur when the operator tips in soon after the tip out to perform a vehicle maneuver. Upon confirming the increase in operator torque demand, at 324, the ESBV is closed and boost delivery is resumed. In addition, fuel delivery to engine cylinders is resumed, the fueling adjusted based on the operator torque demand. Herein, since the manifold pressure is kept elevated by holding the waste-gate valve and CRV closed, and since the supercharger compressor is already activated, when the driver tips back in, more torque is available as soon as the tip-in occurs (e.g., when the driver tips in within 3 seconds of a tip-out). By holding the intake throttle open, air flow to the engine is kept high so that engine torque can be rapidly provided by resuming cylinder fueling. In addition, the boost pressure response is improved (that is, time to torque is reduced) since the tip-in occurs from boosted manifold pressure conditions instead of barometric manifold pressure conditions.

In this way, air path actuators may be adjusted during sand or baja mode operation to maintain an elevated intake manifold pressure even during deceleration and tip-out events. As a result, when a driver tips back in after a tip-out, transient torque deficiencies are reduced improving engine response time and vehicle maneuverability in the performance requiring mode.

In this way, responsive to a first operator pedal tip-out, the controller may maintain manifold pressure above barometric pressure by adjusting one or more air path actuators while responsive to a second operator pedal tip-out, the controller may reduce manifold pressure to barometric pressure by adjusting the one or more air path actuators. Herein the first operator pedal tip-out occurs while the vehicle is operated in a performance mode, while the second operator pedal tip-out occurs while the vehicle is operated in a default mode. For example, the performance mode is selectively actuated responsive to an operator selection received via a vehicle display or dashboard, the performance mode including one of a sand mode where the vehicle is operated on sand, and a baja mode where the vehicle is operated on rocky terrain and in low ambient humidity. The adjusting responsive to the first operator pedal tip-out may include closing each of an exhaust waste-gate valve coupled to a turbocharger turbine, a recirculation valve coupled to a turbocharger compressor, a bypass valve coupled to a supercharger compressor staged upstream of the turbocharger compressor, and an intake throttle while actuating an electric motor coupled to the supercharger compressor. In comparison, the adjusting responsive to the second operator pedal tip-out may include opening each of the exhaust waste-gate valve, the recirculation valve, and the bypass valve while reducing an opening of the intake throttle and while disabling the electric motor. The adjusting responsive to the first operator pedal tip-out may further include adjusting a variable cam timing to maintain intake and exhaust cams at a position of highest volumetric efficiency, while the adjusting responsive to the second operator pedal tip-out further includes adjusting the variable cam timing to move intake and exhaust cams away from the position of highest volumetric efficiency.

Figure 4:
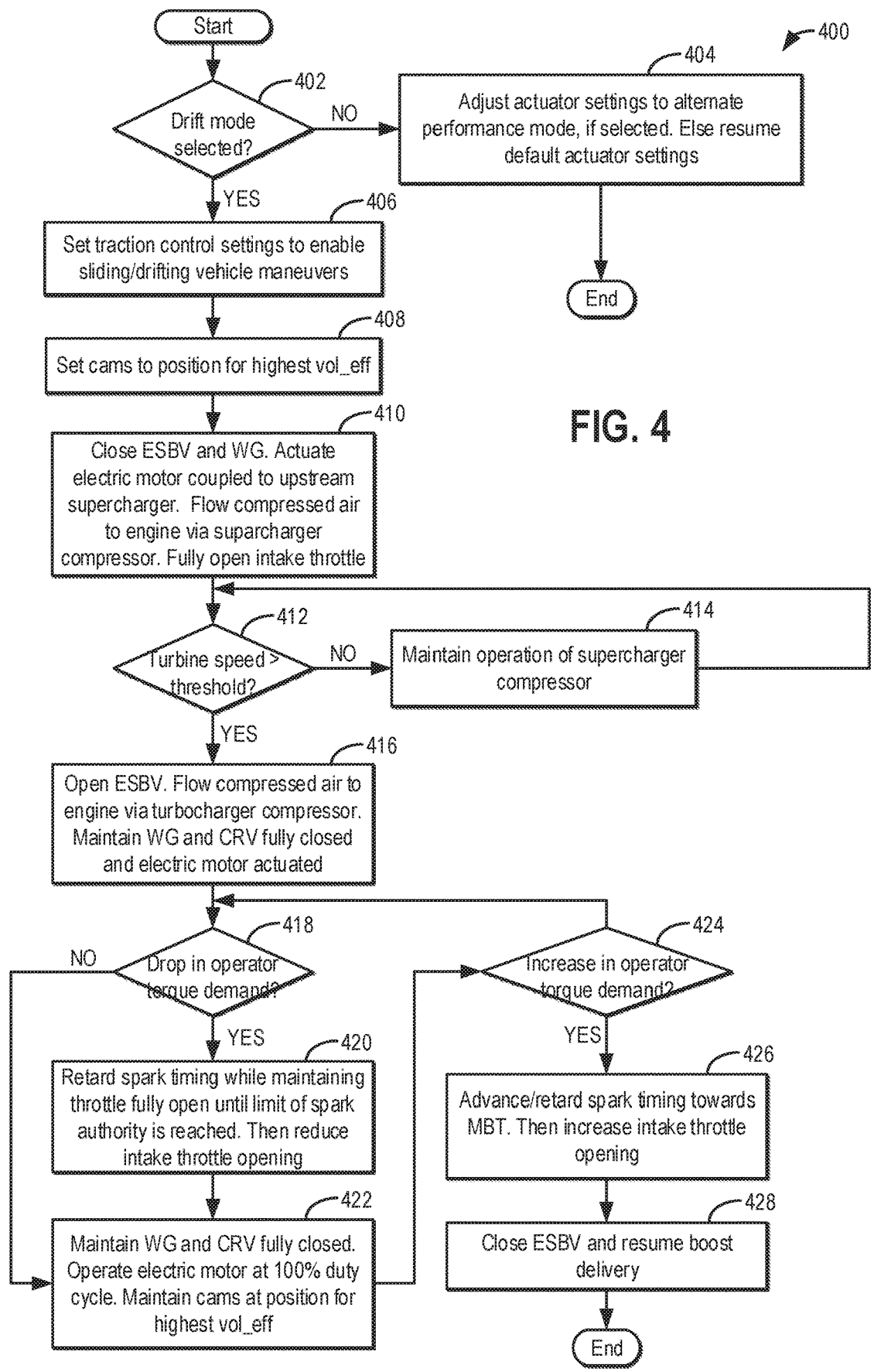
FIG. 4 shows a flowchart illustrating a routine that may be implemented to adjust engine torque actuator settings responsive to selection of a drift mode.

Further, responsive to the first operator pedal tip-out, the controller may selectively disable fuel injectors coupled to a number of cylinders, the number of cylinders increased as an operator torque demand during the first operator pedal tip-out decreases. In comparison, responsive to the second operator pedal tip-out, the controller may reduce fuel delivered to all engine cylinders based on the reduced opening of the intake throttle. Furthermore, during the first operator pedal tip-out, the controller may intermittently open the bypass valve to move a pressure ratio across the supercharger compressor away from a surge limit, while intermittently disabling the electric motor responsive to a state of charge of a battery coupled to the electric motor falling below a threshold charge. Turning now to FIG. 4, an example method 400 is shown for adjusting boost and air path actuator settings responsive to an operator selection of a drift mode. In one example, the method of FIG. 4 may be performed as part of the method of FIG. 2, such as at 214.

At 402, the method includes confirming that a drift mode of vehicle performance has been selected. In one example, the drift mode is actuated responsive to an operator selection received via a vehicle display or dashboard. For example, a selection of the drift mode may be confirmed responsive to the operator actuating a drift mode button on the vehicle display or dashboard. In the drift mode, the vehicle may be configured to better perform sliding maneuvers. If the drift mode selection is not confirmed, at 404, the method includes adjusting actuator settings to an alternate performance mode if an alternate performance mode (e.g., sand or baja mode) was selected. Else, a default mode may be confirmed and default actuator settings may be maintained (or resumed).

If the drift mode is selected, at 406, the method includes applying traction control settings that enable "drifting" or sliding vehicle maneuvers. For example, responsive to the operator selection of the drift mode, traction control settings may be adjusted to increase engine torque delivered to rear wheels relative to front wheels, and to unevenly distribute engine torque between left and right side vehicle wheels. In addition, a light indicating that the vehicle is skidding may be disabled during operation in the drift mode. As another example, throttle settings may be adjusted to provide a higher throttle response to an operator input and to maintain higher idling engine speeds. In addition, transmission settings may be adjusted to be more reactive to high G force inputs from the vehicle operator by holding gears longer and enabling more aggressive downshifts. As elaborated below, further adjustments may be made to ensure that the turbocharger remains spooled for a longer portion of a drive cycle.

Responsive to the selection of the drift mode, the engine is operated with boost to enable the vehicle maneuvers desired in the selected mode to be performed. That is, when a performance mode is selected, the engine is not operated with natural aspiration. Specifically at 408, the method includes setting intake and exhaust cams to a position that provides the highest volumetric efficiency (that is, highest amount of air flow to the engine cylinders at the given operating conditions). By increasing the air flow to engine cylinders, boost response can be improved. At 410, the method includes closing each of the ESBV and the waste-gate valve. For example, both valves may be fully closed responsive to control signals received at corresponding actuators from the controller. Further, the intake throttle may be fully opened and the CRV may be fully closed. In addition, the controller may actuate the electric motor coupled to the first, upstream (supercharger) compressor by sending a signal to operate the electric motor at a higher duty cycle, such as at a 100% duty cycle. The duty cycle of the electric motor may be adjusted to operate the turbocharger compressor outside of the whoosh region. Consequently, air compressed by the supercharger compressor may be flowed to the engine while the turbocharger turbine spins up. By closing the ESBV and actuating the electric motor, the throttle inlet pressure may be raised. By closing the waste-gate valve and the CRV, turbine spin-up and turbocharger operation may be expedited.

At 412, it may be determined if the turbine speed is higher than a threshold, such as above a threshold where the turbocharger is able to drive the second, downstream compressor and sustain the boost demand. If not, operation of the first, upstream compressor (of the supercharger) is maintained at 414 to transiently provide the required boost pressure.

If the turbine speed is above the threshold, then at 416, the method includes opening (e.g., fully opening) the ESBV so that air may flow to the downstream turbocharger compressor while bypassing the upstream supercharger compressor. However, the electric motor of the supercharger may be maintained activated (e.g., at the full duty cycle) and the supercharger compressor may be maintained spinning even though air may not flowing through the supercharger compressor (due to the ESBV being opened). In addition, even after the turbine speed has reached the threshold, the waste-gate valve and the CRV may be held fully closed.

As such, during the drift mode, as the vehicle is maneuvered to drift and slide, the operator torque demand may continually vary. For example, when the vehicle operator modulates the acceleration pedal to control a slide during a drifting maneuver, there may be frequent tip-in and tip-out maneuvers. Therein the vehicle may be decelerated (e.g., the operator may fully tip out) and then accelerated immediately after (e.g., the operator may be then fully tip in), and then decelerated again (and so on). To enable the sudden changes in torque demand to be accommodated without degrading boost response when the operator tips-in, boost and air path actuator settings may be adjusted differently from the default mode and the baja mode of vehicle operation. In particular, at 418, it may be determined if there is a sudden drop in operator torque demand. In one example, a sudden drop in operator torque demand may occur when the operator tips out (e.g., prior to or while performing a sliding maneuver).

If there is no drop in torque demand, the method moves directly to 422 to maintain the waste-gate valve and CRV fully closed, the intake throttle fully open, and the electric motor coupled to the supercharger compressor activated. Further, a variable cam timing may be adjusted to maintain intake and exhaust cams at positions that provide the highest volumetric efficiency. If there is a drop in torque demand, at 420, the method includes first reducing the engine torque by retarding spark timing. For example, the controller may increase the amount of spark ignition timing retard (e.g., from MBT) applied as the operator torque demand drops. The controller may send a control signal to a spark plug actuator, the control signal including a number of degrees of retard to apply relative to a current spark timing, the spark retard control signal determined based on a determination of the decrease in operator torque demand. The decrease in operator torque demand may be based on a measured accelerator pedal position or brake pedal position. The controller may determine the spark retard control signal through a determination that directly takes into account the accelerator pedal position, such as increasing the number of degrees of spark retard applied as the accelerator pedal position moves towards a released position. The controller may alternatively determine the spark retard control signal based on a calculation using a look-up table with the input being operator torque demand (or accelerator pedal position) and the output being number of degrees of spark retard to apply. As another example, the controller may make a logical determination (e.g., regarding a number of degrees of spark retard to apply) based on logic rules that are a function of the operator torque demand. The controller may then generate a control signal that is sent to a spark plug actuator (e.g., a spark plug ionization circuit actuator). Thus the controller may reduce engine torque output based on the decreased operator torque demand by retarding spark timing from MBT while maintaining the intake throttle fully open until a spark limit is reached. The spark limit may be based on engine combustion stability and an exhaust catalyst temperature threshold, as elaborated below.

Spark timing may be retarded based on spark authority with spark retard applied until spark authority is lost (e.g., until spark retard usage reaches a limit). Alternatively, spark timing may be retarded until a hardware constraint is reached. For example, spark timing may be retarded until an exhaust catalyst temperature reaches a threshold temperature. As such, spark retard results in a hotter exhaust being generated due to the later combustion. If the temperature of an exhaust catalytic converter is at a threshold temperature, the addition of further heat into the exhaust via the use of spark retard can cause the catalyst to undergo thermal degradation, resulting in reduced emissions performance of the engine. Therefore, spark timing may be retarded until the exhaust catalyst temperature reaches the threshold temperature. As another example, spark timing may be retarded until a combustion stability limit is reached, beyond which use of further spark retard may cause combustion instability.

After spark retard usage reaches the limit (based on hardware constraints and/or spark authority), if a further drop in torque demand is required, engine torque may be further reduced by decreasing the opening of the intake throttle. Thus, after the spark limit is reached, the controller may further reduce engine torque output by reducing an opening of the intake throttle while maintaining spark timing retarded to the spark limit. For example, the controller may send a signal to an intake throttle actuator to move the intake throttle towards a more closed position. The controller may determine a control signal to send to the throttle actuator through a determination that directly takes into account a difference between the engine torque with spark timing retarded (to the limit) and the operator demanded torque, the control signal decreasing the degree of opening of the intake throttle as the difference between the engine torque with spark timing retarded and the operator demanded torque (at the tip-out) increases (with the engine torque provided with spark timing retarded exceeding the operator demanded torque). In one example, engine torque may be reduced to zero torque (in accordance with a driver demand) by only retarding spark timing while maintaining the intake throttle fully open and while continuing to fuel engine cylinders. In another example, engine torque may be reduced to zero torque (in accordance with the driver demand) by retarding spark timing to a limit while maintaining the intake throttle fully open, and thereafter reducing the opening of the intake throttle while maintaining the spark timing retarded to the limit.

At 422, the method includes maintaining the waste-gate valve and CRV fully closed. In addition, the electric motor coupled to the supercharger compressor may continue to be operated (e.g., at 100% duty cycle). Further, intake and exhaust cams may be maintained at positions that provide the highest volumetric efficiency despite the drop in torque demand. By maintaining the position of the air path and boost actuators at a place where air flow to the engine is increased, intake manifold pressure (as inferred based on a measured MAP or measured throttle inlet pressure) may be maintained elevated, above barometric pressure (for example, at ~40 inHg instead of dropping to barometric pressure of 29 inHg), despite the drop in torque demand. As a result, independent of the change in torque demand, the manifold pressure is maintained elevated.

In this way, responsive to a decrease in operator torque demand while operating in a drift mode, the controller may send a signal to fully close each of an exhaust waste-gate valve coupled to a turbocharger turbine, a recirculation valve coupled to a turbocharger compressor, and a bypass valve coupled to a supercharger compressor staged upstream of the turbocharger compressor, while fully opening an intake throttle valve. Further, the controller may actuate an electric motor coupled to the supercharger compressor. Furthermore, the controller may adjust a variable cam timing to maintain intake and exhaust cams at a position for highest volumetric efficiency responsive to the decrease in operator torque demand.

It will be appreciated that the electric supercharger may be maintained activated with the electric motor operating at 100% duty cycle subject to hardware constraints and system capabilities. For example, responsive to a decrease in margin to surge for the supercharger compressor, such as may occur when the intake air flow to the engine exceeds the supercharger compressor's choke limit or when a pressure ratio across the supercharger compressor moves into a surge region of a compressor map, the supercharger compressor may be transiently deactivated. The supercharger compressor may be deactivated by transiently (or intermittently) opening the bypass valve coupling the supercharger compressor to the intake passage, or by disabling the signal sent to the electric motor (that is, 0% duty cycle) or reducing the duty cycle of the electric motor (to a non-zero value). Then, when the margin to surge increases, and the supercharger compressor has moved away from the choke limit, the supercharger compressor may be reactivated by returning the bypass valve to a fully closed position or by resuming the 100% duty cycle signal sent to the electric motor. In another example, the supercharger compressor may be transiently deactivated responsive to a drop in the state of charge of the battery powering the electric motor (e.g., to below a threshold state of charge). While the supercharger is deactivated, the battery may be recharged, such as via regenerative braking or using engine torque (in excess of demanded torque). Then, once the battery is charged to above the threshold state of charge, the supercharger compressor may be reactivated by resuming the 100% duty cycle signal sent to the electric motor.

Next, at 424, it may be determined if there is an increase in torque demand. In one example, a sudden increase in operator torque demand may occur when the operator tips in soon after the tip out to perform a sliding or drifting vehicle maneuver. Upon confirming the increase in operator torque demand, at 426, the increase in torque demand is provided by first adjusting spark timing. Specifically, spark timing may be advanced towards MBT (if previously operating with spark timing retard). For example, the controller may increase the amount of spark ignition timing advance (e.g., towards MBT) applied as the operator torque demand increases. The controller may send a control signal to a spark plug actuator, the control signal including a number of degrees of advance to apply relative to a current spark timing, the spark advance control signal determined based on a determination of the increase in operator torque demand. The increase in operator torque demand may be based on a measured accelerator pedal position. The controller may determine the spark advance control signal through a determination that directly takes into account the accelerator pedal position, such as increasing the number of degrees of spark advance applied as the accelerator pedal position moves towards a released position, and as a distance from the current spark timing to MBT increases. The controller may alternatively determine the spark advance control signal based on a calculation using a look-up table with the inputs being operator torque demand (or accelerator pedal position) and margin to MBT, and the output being number of degrees of spark advance to apply. As another example, the controller may make a logical determination (e.g., regarding a number of degrees of spark advance to apply) based on logic rules that are a function of the operator torque demand. The controller may then generate a control signal that is sent to a spark plug actuator (e.g., a spark plug ionization circuit actuator). In an alternate example, spark timing may be retarded towards MBT (if previously operating with spark timing advance).

Spark timing may be advanced based on margin to MBT spark until spark timing reaches MBT. After spark timing reaches MBT, if a further increase in torque demand is required, engine torque may be further increase by increasing the opening of the intake throttle. For example, the controller may send a signal to an intake throttle actuator to move the intake throttle towards a more open position. The controller may determine a control signal to send to the throttle actuator through a determination that directly takes into account a difference between the engine torque with spark timing at MBT and the operator demanded torque, the control signal increasing the degree of opening of the intake throttle as the difference between the engine torque with spark timing at MBT and the operator demanded torque (at the tip-in) increases (with the engine torque provided with spark timing at MBT falling below the operator demanded torque). In one example, engine torque may be increased in accordance with a driver demand by only advancing spark timing while maintaining the intake throttle position. In another example, engine torque may be increased in accordance with the driver demand by advancing spark timing to MBT while maintaining the intake throttle position, and thereafter increasing the opening of the intake throttle (e.g., to a fully open position) while maintaining the spark timing at MBT.

At 428, the method includes closing the ESBV responsive to the increase in operator torque demand and resuming boost delivery. Herein, since the manifold pressure is kept elevated by holding the waste-gate valve and CRV closed, and since the supercharger compressor is already activated, when the driver tips back in, more torque is available as soon as the tip-in occurs. By also holding the intake throttle open, air flow to the engine is kept high so that engine torque can be rapidly provided by resuming cylinder fueling. In addition, the boost pressure response is improved (that is, time to torque is reduced) since the tip-in occurs from boosted manifold pressure conditions instead of barometric manifold pressure conditions.

Thus, responsive to an increase in operator torque demand while operating in the drift mode, the controller may maintain each of the exhaust waste-gate valve, the recirculation valve, and the bypass valve closed, and the electric motor actuated, while increasing engine torque output based on the increased torque demand by moving spark timing towards MBT and while maintaining the intake throttle fully open. Then, after spark timing reaches MBT, the controller may further increase engine torque output by increasing an opening of the intake throttle valve while maintaining spark timing at MBT. In this way, a throttle inlet pressure may be maintained above barometric pressure responsive to each of the increase and decrease in operator torque demand.

In this way, air path actuators may be adjusted during a drift mode of operation to maintain an elevated intake manifold pressure and throttle inlet pressure regardless of accelerator pedal position, including during deceleration and tip-out events. Together with the actuators at their optimum power settings, a positive feedback loop is created. As a result, when a driver tips in after a tip-out (e.g., when the driver tips in within 3 seconds of a tip-out), transient torque deficiencies are reduced improving engine response time and vehicle maneuverability in the performance requiring mode.

It will be appreciated that while the methods of FIGS. 3-4 describe adjustments to the setting of air path and boost actuators in sand/baja and drift modes, this is not meant to be limiting and similar settings may be applied in other performance modes. For example, responsive to an operator selecting a vehicle launch mode to improve the performance of a vehicle launch (from rest), engine actuators may be adjusted in a coordinated fashion to improve the transient peak acceleration during the launch. Specifically, when a launch mode is selected (via the actuation of a launch mode button on a vehicle display or dashboard), one or more air path actuators may be pre-positioned to an optimum power position before vehicle take-off. For example, responsive to the operator selection of the launch mode, the waste-gate valve may be held fully closed, the electric motor of the upstream supercharger compressor may be activated to a 100% duty cycle, and intake and exhaust cams may be pre-positioned to their highest volumetric efficiency positions. In addition, the CRV may opened, or maintained open before the launch to improve the transient response. For example, if the launch includes a tip-in large enough to require boost, and prior to this tip-in, boost was not required or boost level was below a threshold, then the CRV may be opened immediately. However, if the CRV was already open prior to tip-in (for surge mitigation, for example), then the CRV may be maintained open. The technical effect of opening the CRV for at least a duration responsive to a vehicle launch request is that the turbocharger compressor may be spun faster and thus, the turbocharger speed may be increased at a faster rate. Once the turbocharger speed reaches a threshold speed (or after a threshold time has elapsed since the opening of the CRV), the CRV may be closed. By closing the CRV, the increased turbocharger speed may be translated to higher boost levels. In this way, air path actuator adjustments may be coordinated so that it may be possible to achieve higher boost levels in a shorter amount of time. Meanwhile, the controller may regulate the engine speed and intake throttle position when the vehicle operator fully applies the accelerator pedal (to a wide open throttle position so as to launch the vehicle). Spark timing may also be retarded (subject to combustion instability and catalytic converter temperature constraints) so as to increase the exhaust temperature, thereby increasing the turbine energy for the turbocharger. The target engine speed for the launch event may be controlled via throttle and fueling adjustments. By pre-positioning the air path actuators, the intake manifold pressure may be increased above barometric pressure before the vehicle takes off (before the launch command is received). As a result, when the operator does fully tip in, a higher peak initial vehicle acceleration can be achieved, improving the launch response time and launch performance. Once the boost pressure reaches the target threshold, the throttle, the exhaust bypass, and the CRV may be actively controlled to maintain the boost pressure at the desired pressure. In addition, if spark retard was used, spark timing may be advanced towards MBT.

In this way, an engine controller may transition the engine to a drift mode of operation responsive to an operator selection; and while operating in the drift mode, independent of operator torque demand, the controller may maintain each of an exhaust waste-gate valve coupled to a turbocharger turbine, a recirculation valve coupled to a turbocharger compressor, and a bypass valve coupled to a supercharger compressor, staged upstream of the turbocharger compressor, fully closed, while maintaining an intake throttle fully open, and while actuating an electric motor coupled to the supercharger compressor. The controller may actuate the electric motor by maintaining a duty cycle of the electric motor at a full duty cycle. Further, while operating in the drift mode, responsive to a decrease in the operator torque demand, the controller may reduce engine torque by retarding spark timing from MBT while the intake throttle is fully open until a spark limit is reached, and thereafter further reducing engine torque by maintaining spark timing retarded to the spark limit while reducing an intake throttle opening. In comparison, responsive to an increase in the operator torque demand while operating in the drift mode, the controller may raise engine torque by advancing spark timing towards MBT while the intake throttle is fully open, and after spark timing reaches MBT, further raise engine torque by maintaining spark timing at MBT while increasing the intake throttle opening.

In one example, while the vehicle is already in a drive mode, such as the baja mode, sand mode, or the drift mode, the controller may determine if engine deceleration fuel shut off (DFSO) conditions are met and further than the engine is not in a cold-start emission reduction (CSER) condition. In one example, DFSO conditions are met when the operator torque demand is reduce, enabling the engine to be operated with fuel selectively shut off while air continues to be pumped through the cylinders via cylinder valves. In another example, CSER conditions are considered met if engine temperature or exhaust catalyst temperature is lower than a threshold temperature. If the specified conditions are met, the controller may initiate a timer and start incrementing time on the timer. The controller may then determine if a threshold amount of time has elapsed since the timer was initiated. If not, the controller may maintain engine settings. Else, if the threshold time has elapsed, the controller may enable coordination of engine actuators while operating in the drive mode. In response to the drive mode still being selected and DFSO conditions being discontinued, the controller may disable coordination of engine actuators while resetting the timer. In this way, an electric boost source may be provided and engine actuators may be pre-positioned to their optimal performance setting when there is steering input. Vehicle speed, pedal position, and timers may be used alongside to improve the robustness of the algorithm.

Figure 5:
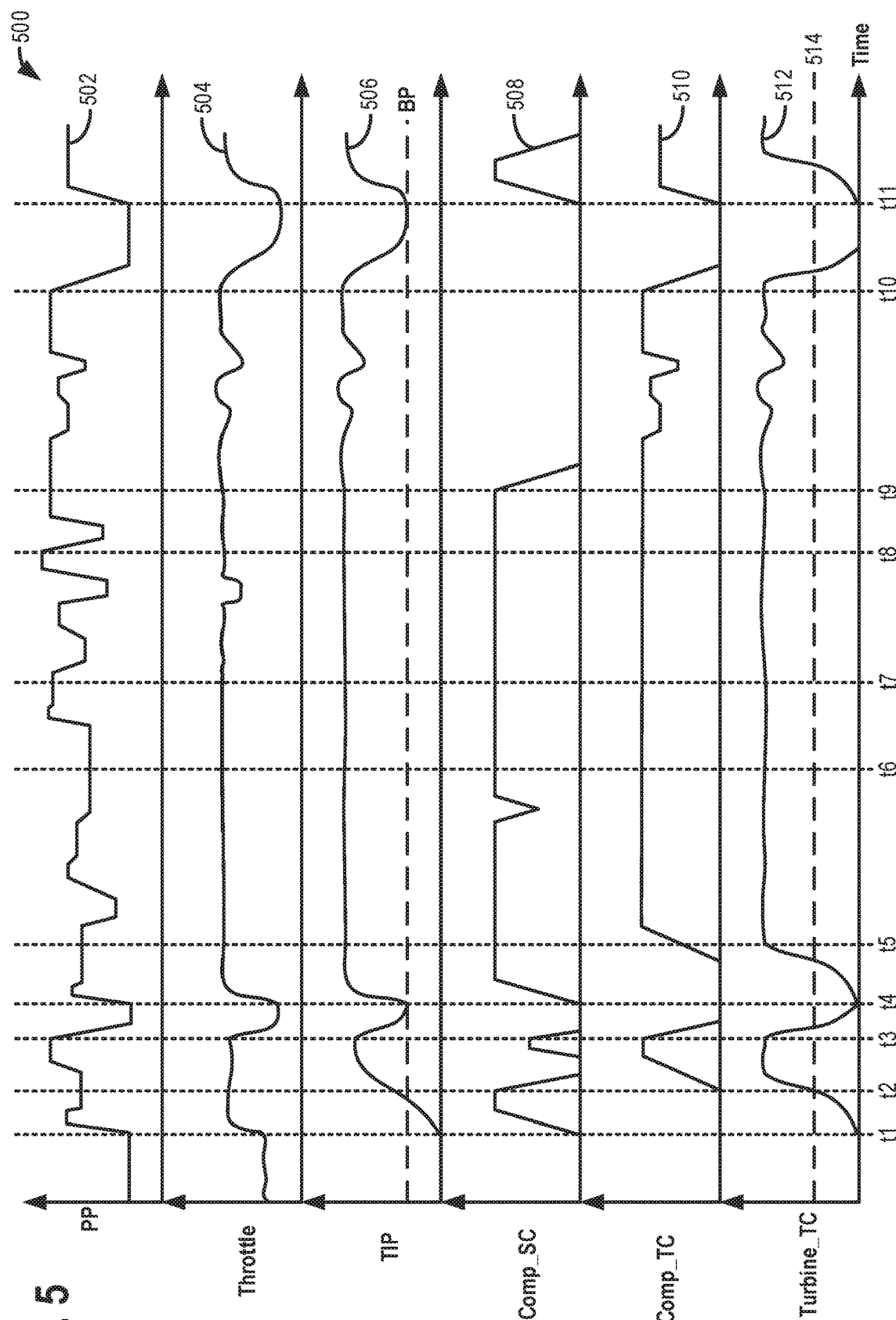
FIGS. 5-6 show a prophetic operation of a boosted engine to improve transient responsive during vehicle maneuvers, according to the present disclosure.
Figure 6:
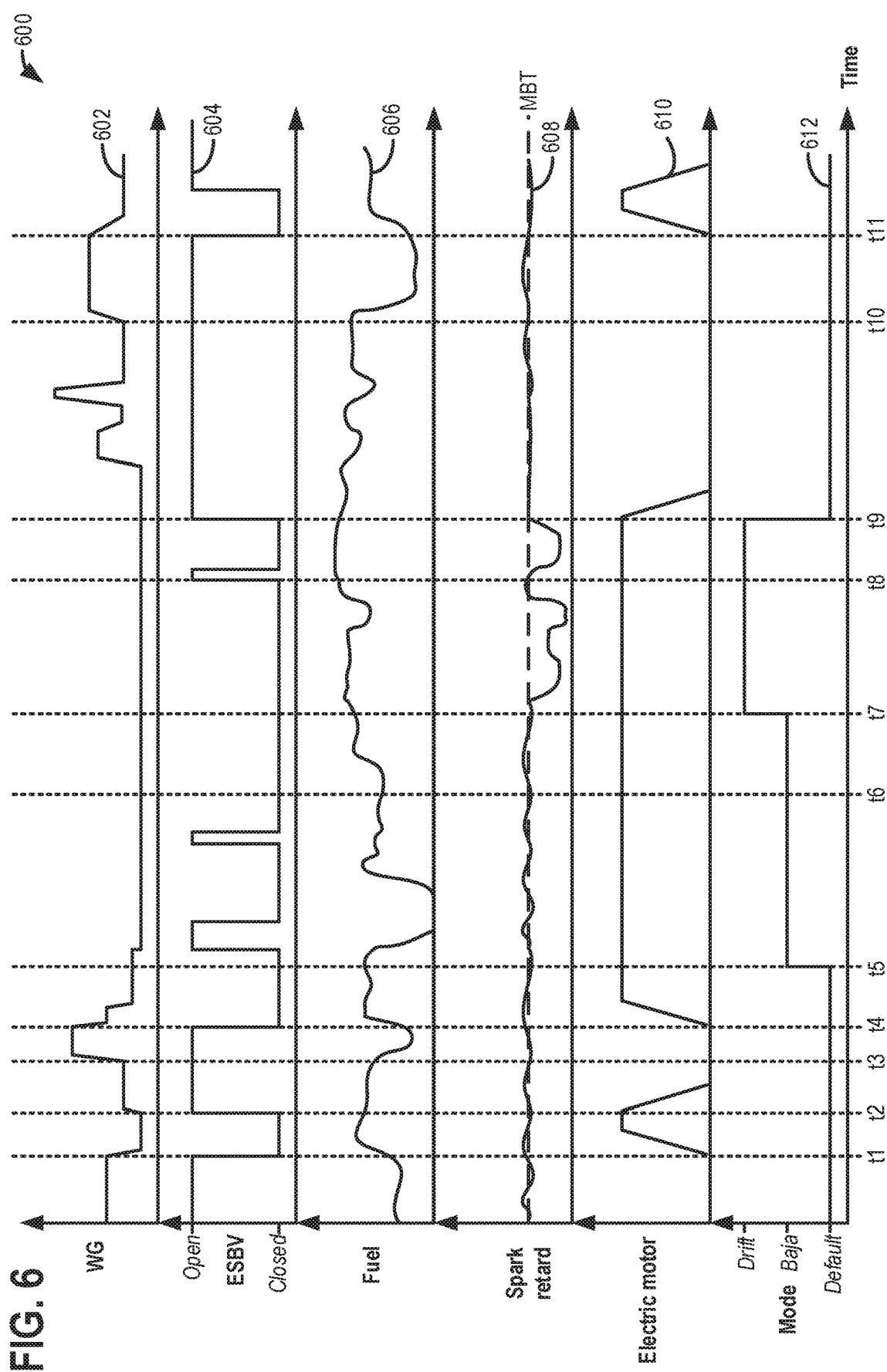

Turning now to FIGS. 5-6, a prophetic example timeline of operation of a boosted engine with an electric supercharger staged upstream of a downstream turbocharger is shown at example maps 500 and 600. It will be appreciated that FIGS. 5-6 combined represent a single example timelines. The horizontal axis (x-axis) denotes time and the vertical markers t1-t11 identify significant times for supercharger operation.

Plot 502 shows variation in an accelerator pedal position over time. Plot 504 shows changes in the opening of an intake throttle over time. Plot 506 shows variation in throttle inlet pressure (TIP, indicative of boost pressure) over time. Plot 406 shows variation of a turbocharger turbine speed over time. Plot 508 shows variation of an electric supercharger compressor speed (Comp_ES). Plot 510 shows variation of a turbocharger compressor speed (Comp_TC). Plot 512 shows variation of a turbocharger turbine speed (Turbine_TC). Plot 602 shows changes in the position of an exhaust waste-gate valve (WG) coupled across the turbocharger turbine. The waste-gate valve is opened to allow exhaust to bypass the turbocharger turbine, thereby spinning it down, or closed to direct exhaust through the turbine, thereby spinning it up. Plot 604 shows changes in the position of an electric supercharger bypass valve (ESBV) coupled across the electric supercharger. The ESBV is opened to allow intake air to bypass the electric supercharger or closed to direct air through the electric supercharger. Plot 606 shows engine fueling while plot 608 shows spark timing retard (relative to MBT). Plot 608 shows the operation (e.g., the duty cycle commanded) of an electric motor driving the supercharger compressor. The supercharger speed may be adjusted via adjustments to a duty cycle commanded to the electric motor. Plot 610 shows a mode of vehicle operation selected by a vehicle operator, such as via actuation of a button of a vehicle display or dashboard. In the depicted example, the operator may select between a default mode, a baja mode, and a drift mode. In the present example, the ES compressor is positioned upstream of the TC compressor in the intake passage. Further, the ESBV is located in the intake passage upstream of the ES compressor while the intake throttle is positioned downstream of the TC compressor in the intake passage.

Prior to time t1, the operator has not selected any performance mode. Therefore the vehicle is operated in a default mode. At this time, engine is operating without boost (plot 506) due to a lower driver demand (plot 502). Consequently the throttle inlet pressure is at barometric pressure conditions (dashed line, BP). The intake throttle (plot 504) is partially open to provide a desired engine speed-load profile based on the driver torque demand. At this time, the electric motor is deactivated (plot 610) and the ESBV is fully open (plot 604) and therefore the supercharger compressor is not spinning or compressing air (plot 508). In addition, the waste-gate valve is fully open (plot 602) and therefore neither the turbocharger turbine (plot 512) nor the turbocharger compressor are spinning or compressing air (plot 510). Cylinder fueling is adjusted as a function of the intake air flow to operate the engine at a target air-fuel ratio (e.g., at or around stoichiometry). Spark timing is held at or around MBT. Intake and exhaust cams are moved to a position (not shown) that provides the highest volumetric efficiency.

At time t1, the operator tips in, moving the engine from engine operation with natural aspiration to engine operation with boost. In response to the tip-in, throttle opening is increased to meet the increased air flow demand, and engine fueling increases correspondingly. Spark timing is held at or around MBT. The engine boost pressure is increased in response to the pedal tip-in event by actuation of an electric motor coupled to the supercharger compressor to increase the electric supercharger compressor speed. A duty cycle delivered to the electric motor of the supercharger may be increased so as to accelerate the supercharger compressor. For example, the supercharger duty cycle is moved to or towards a 100% duty cycle to operate the supercharger at a full (maximum) speed. At the same time, the ESBV is closed to route more air through the supercharger compressor. Also at the same time, the waste-gate valve opening is reduced (e.g., the valve is closed) to flow more exhaust through the turbocharger turbine and expedite turbine spin-up. By operating the smaller electric supercharger compressor in response to the pedal tip-in event, the throttle inlet pressure can be rapidly increased to meet the driver demand while the turbine spins up. Between t1 and t2, intake air compressed by only the upstream supercharger compressor is delivered to the engine to meet the boost demand. Also at this time, the turbine starts to spin up. Intake and exhaust cams are moved to a position that provides the highest volumetric efficiency.

At t2, the turbine reaches a threshold speed 514 above which the turbine is able to drive the turbocharger compressor with a resulting increase in the turbocharger compressor speed. Thereafter the turbocharger (TC) compressor is able to meet the driver demanded boost pressure. Accordingly at t2, the turbocharger compressor speed starts to increase. Also at t2, the ESBV is opened to route more air through the turbocharger compressor while bypassing the supercharger compressor. In addition, a duty cycle delivered to the electric motor of the supercharger may be decreased so as to decelerate the supercharger compressor. At this time, intake air compressed by only the downstream turbocharger compressor is delivered to the engine to meet the boost demand. As such, if the electric supercharger compressor were not spun, due to the delay in turbine spin-up, there may have been a turbo lag (delay in the actual boost pressure reaching the desired boost pressure). In particular, by operating the electric supercharger (ES), the desired boost pressure is provided by t2, in comparison to the turbo lag case where the desired boost pressure is provided after t2.

Between t2 and t3, there is a transient increase in operator torque demand. Responsive to the rise in torque demand, the waste-gate valve opening is reduced. However the turbocharger compressor is already operating at a maximum speed and the torque demand cannot be met via the turbocharger compressor alone. Therefore the supercharger compressor is activated to supplement the boost pressure by operating the electric motor. A duty cycle corresponding to the torque deficit is commanded to the electric motor. Thus at this time, the driver demanded torque is met using both the turbocharger compressor and the supercharger compressor.

At t3, the driver demand decreases responsive to the operator releasing the accelerator pedal. Responsive to the drop in driver demand, the waste-gate valve opening is increased to a fully open position so that exhaust can bypass the turbine and decelerate the turbine, thereby decelerating the turbocharger compressor. In addition, a compressor recirculation valve (not shown) coupled across the turbocharger compressor is opened to dump boost pressure upstream of the compressor, thereby rapidly reducing the throttle inlet pressure to barometric pressure conditions (BP). The intake throttle opening is decreased to reduce the air flow to engine cylinders, and cylinder fueling is correspondingly decreased. Intake and exhaust cams are moved away from the position (not shown) that provides the highest volumetric efficiency.

At t4, the operator tips in again. Responsive to the rise in torque demand, the waste-gate valve opening is reduced to spin up the turbine, which spins up the turbocharger compressor. The transient boost pressure demand is met by actuating the electric motor to spin up the supercharger compressor. Between t4 and t5, the turbine speed reaches threshold 514 and the turbocharger compressor starts to spin up.

However before the supercharger can be deactivated, at t5, the operator actuates a button to shift vehicle operation from the default mode to a baja mode. Responsive to the selection of the baja mode, at t5, the electric motor is maintained activated (at 100% duty cycle) even though the turbocharger compressor is spinning and compressing air. In addition, the ESBV is closed so that air can be compressed by the supercharger. Further, the waste-gate valve is fully closed and a CRV (not shown) is also fully closed. In addition, the intake throttle is moved to fully open position. As a result of the air path actuator adjustments, the throttle inlet pressure is maintained elevated above BP.

At t6, while in the baja mode, there is a drop in operator torque demand due to the operator tipping out of the accelerator pedal. Despite the drop in torque demand, the air path actuators are held at the position that provides the highest air flow to the engine. In particular, the waste-gate valve and CRV are held closed, the intake throttle is held fully open, and intake and exhaust cams are held at the position of highest volumetric efficiency. Further, the ESBV is opened while the electric motor is maintained activated and running at a 100% duty cycle. Consequently, both the supercharger and turbocharger compressor may be spinning. As a result, the throttle inlet pressure is held above BP even during the deceleration event. The engine torque is reduced (to zero torque) to meet the reduced torque demand by shutting off fuel to all engine cylinders (plot 606).

Shortly after the tip-out, the operator tips in again to perform a cornering maneuver while in the baja mode. To rapidly provide the higher torque demand, engine fueling is resumed. In addition, the ESBV is closed so that air compressed by the supercharger and the turbocharger are immediately delivered to the engine. As a result, torque demand may be met as soon as the tip-in occurs, improving boost response.

The ESBV is held closed with the electric motor activated despite changes (including increases and decreases) in torque demand so as to keep delivering air compressed by the supercharger compressor to the engine. However, during conditions when the margin to surge for the supercharger compressor reduces, such as occurs once between t5 and t6, the ESBV may be transiently opened to reduce the supercharger compressor speed, thereby reducing the pressure ratio across supercharger. Once the supercharger compressor pressure ratio moves sufficiently away from a choke limit, that is, when the margin improves, the ESBV may be closed and the supercharger compressor may spin up again.

In this way, while in the baja mode, between t6 and t7, air path and boost actuators are held in positions that enable higher power output and that enable the throttle inlet pressure to be kept elevated over BP while engine torque is adjusted responsive to changing torque demand via cylinder fueling adjustments. For example, when the torque demand reduces, the number of cylinders where fueling is selectively deactivated is increased by deactivating corresponding fuel injectors. As another example, when the torque demand reduces to zero torque, fuel to all engine cylinders is selectively deactivated.

At t7, the operator actuates a button to shift vehicle operation from the baja mode to a drift mode. Responsive to the selection of the drift mode, at t7, the electric motor is maintained activated (at 100% duty cycle). In addition, the ESBV is held closed so that air can continue to be compressed by the supercharger. Further, the waste-gate valve is held fully closed and the CRV (not shown) is also fully closed. In addition, the intake throttle is held at the fully open position. Further, intake and exhaust cams are held at the position of highest volumetric efficiency. As a result of the air path actuator adjustments, the throttle inlet pressure is maintained elevated above BP.

Between t7 and t8, the operator torque demand fluctuates. However, the air path actuator positions are maintained. Engine torque is modulated via spark timing adjustments initially, and then if the engine torque demand cannot be met via spark adjustments alone, via the further use of intake throttle adjustments. For example responsive to a first (smaller) drop in torque demand immediately after t7, engine torque is reduced by retarding spark from MBT while maintaining the intake throttle fully open (and while holding the WG and ESBV closed, and the electric motor at 100% duty cycle). When the operator torque demand rises thereafter, engine torque is increased by moving spark timing back to MBT while maintaining all other actuator positions. Responsive to a subsequent (larger) drop in torque demand, engine torque is initially reduced by retarding spark from MBT while maintaining the intake throttle fully open (and while holding the WG and ESBV closed, and the electric motor at 100% duty cycle) until a spark limit is reached. However, due to the use of only spark retard not being sufficient to reduce the engine torque to the demanded torque level, the intake throttle opening is reduced while holding spark retarded at the limit, and while reducing fueling in accordance with the throttle opening. When the operator torque demand rises thereafter, engine torque is increased by moving spark timing back to MBT and returning the intake throttle to the fully open position. As a result of the air path actuator adjustments, the throttle inlet pressure is maintained elevated above BP throughout the drift mode so that when torque demand increases, the demanded torque can be immediately provided.

At t8, there is another tip-out causing another drop in torque demand. At this time, the tip-out causes the margin to surge of the supercharger compressor to decrease. Therefore, engine torque is reduced by retarding spark timing while holding the WG closed, the electric motor at 100% duty cycle, and the intake throttle fully open. However the ESBV is transiently opened to the pressure ratio across the supercharger compressor to increase, moving the supercharger compressor away from a choke limit. Once the margin to surge is improved, despite the drop in torque demand, the ESBV is closed so that throttle inlet pressure may be maintained elevated in the drift mode.

In this way, while in the drift mode, air path and boost actuators are held in positions that enable higher power output and that enable the throttle inlet pressure to be kept elevated over BP while engine torque is adjusted responsive to changing torque demand via spark timing and intake throttle adjustments.

At t9, the operator resumes the default mode of vehicle operation. Responsive to the return to the default mode, the electric motor is deactivated and the ESBV is opened to spin down the supercharger compressor. In addition, the waste-gate valve opening is increased to lower the turbocharger compressor speed and thereby the boost pressure in accordance with the demanded torque. Between t9 and t10, the ESBV is held closed, the electric motor is held deactivated, and the supercharger compressor is not spinning. At this time, changes in torque demand are met via adjustments to the position of the waste-gate valve and the intake throttle with corresponding changes in TIP. For example, when torque demand increases, the waste-gate valve opening is decreased and the intake throttle opening is increased to raise TIP. As another example, when torque demand decreases, the waste-gate valve opening is increased and the intake throttle opening is decreased to lower TIP. In each case, fueling is adjusted based on intake throttle opening to maintain a desired air-fuel ratio. In addition, spark timing is held at MBT. Further, intake and exhaust cam positions are continually adjusted based on the torque demand.

At t10, the operator tips out. Responsive to the tip-out, while the supercharger is maintained disabled and the ESBV is held open, the waste-gate valve is fully opened to spin down the turbocharger turbine and thereby the compressor. In addition, the intake throttle opening sir reduced. As a result, the throttle inlet pressure is quickly returned to BP.

At t11, the operator tips in again. Herein the TIP has to be raised from BP. To reduce turbo lag, the ESBV is closed and the electric motor is activated to increase the supercharger compressor speed and provide transient boost pressure via the supercharger. The intake throttle opening is increased. Also, the waste-gate valve is moved to a closed position to spin up the turbine. Once the turbine reaches threshold speed 514, the turbocharger speed starts to increase and the turbocharger compressor is able to hold the TIP elevated. Thereafter the ESBV is opened and the electric motor is disabled to spin down the compressor, and meet the engine torque demand via the turbocharger only.

In this way, responsive to a first operator pedal tip-out, an engine controller may maintain manifold pressure above barometric pressure by adjusting one or more air path actuators while reducing engine torque by disabling cylinder fueling while responsive to a second operator pedal tip-out, the controller may maintain manifold pressure above barometric pressure by adjusting the one or more air path actuators while reducing engine torque by retarding spark timing. Further, responsive to a third operator pedal tip-out, the controller may reduce manifold pressure to barometric pressure by adjusting the one or more air path actuators. Herein the first operator pedal tip-out occurs while the vehicle is operated in a sand or baja mode, the second operator pedal tip-out occurs while the vehicle is operated in a drift mode, and the third operator pedal tip-out occurs while the vehicle is operated in a default mode. The baja mode may be selectively actuated responsive to a first operator selection received via a vehicle display or dashboard, the baja mode including the vehicle operated on rocky terrain and in low ambient humidity, the drift mode may be selectively actuated responsive to a second operator selection received via the vehicle display or dashboard, the drift mode including sliding vehicle maneuvers, and the default mode may be actuated responsive to no operator selection being received.

The adjusting responsive to each of the first and second operator pedal tip-outs may include closing each of an exhaust waste-gate valve coupled to a turbocharger turbine, a recirculation valve coupled to a turbocharger compressor, a bypass valve coupled to a supercharger compressor staged upstream of the turbocharger compressor, and an intake throttle while actuating an electric motor coupled to the supercharger compressor. In comparison, the adjusting responsive to the third operator pedal tip-out may include opening each of the exhaust waste-gate valve, the recirculation valve, and the bypass valve while reducing an opening of the intake throttle and while disabling the electric motor. The adjusting responsive to each of the first and second operator pedal tip-outs may further include adjusting a variable cam timing to maintain intake and exhaust cams at a position of highest volumetric efficiency, while the adjusting responsive to the third operator pedal tip-out further includes adjusting the variable cam timing to move intake and exhaust cams away from the position of highest volumetric efficiency. Reducing engine torque by retarding spark timing responsive to the operator pedal tip-out in the drift mode may include retarding spark timing until an exhaust catalyst temperature is higher than a threshold, and responsive to engine torque with spark timing retarded being higher than operator demanded torque, maintaining spark timing retarded while reducing the opening of the intake throttle. Further, during each of the first and second operator pedal tip-out, the controller may intermittently open the bypass valve to move a pressure ratio across the supercharger compressor away from a surge limit. Furthermore, during each of the first and second operator pedal tip-outs, the controller may intermittently disable the electric motor responsive to a state of charge of a battery coupled to the electric motor falling below a threshold charge.

In this way, vehicle maneuverability is improved for a boosted engine, particularly when performing vehicle maneuvers on selected terrains and when performing selected vehicle maneuvers that require frequent changes in torque demand. By holding air and boost path actuators at positions that maintain a throttle inlet pressure elevated, despite changes in torque demand, including during conditions when torque demand drops, transient torque deficiencies arising when torque demand increases soon after dropping can be reduced. By holding an exhaust waste-gate valve fully closed during the selected modes and maneuvers, irrespective of whether an operator torque demand increases or decreases, a turbocharger compressor can be maintained spinning so that boost pressure can be provided as soon as it is needed. Likewise, by holding a supercharger bypass valve fully closed and an electric motor of the supercharger fully activated during the selected modes and maneuvers, irrespective of whether an operator torque demand increases or decreases, a supercharger compressor can be maintained spinning so that transient boost pressure can be provided as soon as it is needed Concurrently, coordinated adjustments between cylinder fueling, spark timing, and intake throttle opening may be used to modulate engine torque, enabling the throttle inlet pressure to be held above barometric pressure. By maintaining the throttle inlet pressure or manifold pressure elevated during a tip-out, a time to torque during a subsequent tip-in can be significantly reduced, improving vehicle maneuverability and drivability. In addition, vehicle launch times may be reduced.

One example vehicle method comprises: responsive to a decrease in operator torque demand, fully closing each of an exhaust waste-gate valve coupled to a turbocharger turbine, a recirculation valve coupled to a turbocharger compressor, and a bypass valve coupled to a supercharger compressor staged upstream of the turbocharger compressor; fully opening an intake throttle valve; and actuating an electric motor coupled to the supercharger compressor. In the preceding example, additionally or optionally, the method further comprises, adjusting a variable cam timing to maintain intake and exhaust cams at a position for highest volumetric efficiency responsive to the decrease in operator torque demand. In any or all of the preceding examples, additionally or optionally, actuating the electric motor includes commanding a full duty cycle to the electric motor. In any or all of the preceding examples, additionally or optionally, the decrease in operator torque demand occurs while the vehicle is operated in a driver selected performance mode, wherein the selected performance mode includes one of operating the vehicle on a selected terrain, and operating the vehicle with selected maneuvers. In any or all of the preceding examples, additionally or optionally, the selected performance mode includes one of a sand mode where the vehicle is driven on sandy terrain, a baja mode where the vehicle is driven on a rocky terrain, and a drift mode where the vehicle performs sliding maneuvers. In any or all of the preceding examples, additionally or optionally, the method further comprises, maintaining a throttle inlet pressure above barometric pressure responsive to the decrease in operator torque demand. In any or all of the preceding examples, additionally or optionally, the method further comprises, reducing engine torque output based on the decreased operator torque demand by shutting of fuel to one or more engine cylinders, a number of cylinder fuel injectors deactivated increased as the operator torque demand decreases. In any or all of the preceding examples, additionally or optionally, the method further comprises, in response to a decrease in margin to surge for the supercharger compressor, transiently opening the bypass valve, and when the margin to surge increases, returning the bypass valve to a fully closed position. In any or all of the preceding examples, additionally or optionally, the decrease in operator torque demand is responsive to an operator pedal tip-out immediately following an operator pedal tip-in. In any or all of the preceding examples, additionally or optionally, the method further comprises, maintaining each of the exhaust waste-gate valve, the recirculation valve, and the bypass valve fully closed, the intake throttle valve fully open, and the electric motor actuated responsive to an operator selected vehicle launch mode.

Another example vehicle system comprises: an engine having an intake; a first intake compressor driven by an electric motor; a second intake compressor driven by an exhaust turbine positioned downstream of the first compressor along the intake; an intake throttle coupled downstream of the second compressor; a waste-gate including a waste-gate valve coupled across the exhaust turbine; a first compressor bypass including a first valve coupled across the first compressor; a second compressor passage including a second valve coupled across the second compressor; a fuel injector coupled to each cylinder of the engine; a pressure sensor for estimating a manifold pressure at an inlet of the intake throttle; a vehicle display including a plurality of operator selectable buttons; and a controller. The controller is configured with computer readable instructions stored on non-transitory memory for: transitioning the engine to one of a sand or baja mode based on an operator selection received via the vehicle display; and in response to a decrease in operator demanded torque while in the sand or baja mode, maintaining manifold pressure above barometric pressure by fully closing each of the waste-gate valve, the first valve, and the second valve, fully opening the intake throttle, and actuating the electric motor to a full duty cycle. In the preceding example, additionally or optionally, the controller includes further instructions for, disabling the fuel injector coupled to a number of cylinders, the number of cylinders selected increased as the operator demanded torque decreases. In any or all of the preceding examples, additionally or optionally, the controller includes further instructions for: maintaining the engine in a default mode in response to absence of operator selection; and in response to a decrease in operator demanded torque while in the default mode, reducing manifold pressure to barometric pressure by increasing an opening of each of the waste-gate valve, the first valve, and the second valve, while reducing the opening of the intake throttle, and disabling the electric motor to a zero duty cycle.

Another example vehicle system comprises: an engine having an intake; a first intake compressor driven by an electric motor; a second intake compressor driven by an exhaust turbine positioned downstream of the first compressor along the intake; an intake throttle coupled downstream of the second compressor; a waste-gate including a waste-gate valve coupled across the exhaust turbine; a first compressor bypass including a first bypass valve coupled across the first compressor; a second compressor bypass including a second bypass valve coupled across the second compressor; a fuel injector coupled to each cylinder of the engine; a pressure sensor for estimating a manifold pressure at an inlet of the intake throttle; a vehicle display including a plurality of operator selectable buttons; and a controller. The controller is configured with computer readable instructions stored on non-transitory memory for: transitioning the engine to one of a sand or baja mode based on an operator selection received via the vehicle display; and in response to a decrease in operator demanded torque while in the sand or baja mode, maintaining manifold pressure above barometric pressure by fully closing each of the waste-gate valve, the first bypass valve, and the second bypass valve, fully opening the intake throttle, and actuating the electric motor to a full duty cycle. In the preceding example, additionally or optionally, the controller includes further instructions for, disabling the fuel injector coupled to a number of cylinders, the number of cylinders selected increased as the operator demanded torque decreases. In any or all of the preceding examples, additionally or optionally, the controller includes further instructions for: maintaining the engine in a default mode in response to absence of operator selection; and in response to a decrease in operator demanded torque while in the default mode, reducing manifold pressure to barometric pressure by increasing an opening of each of the waste-gate valve, the first bypass valve, and the second bypass valve, while reducing the opening of the intake throttle, and disabling the electric motor to a zero duty cycle.

Another example vehicle method comprises: responsive to a decrease in operator torque demand while operating in a drift mode, fully closing each of an exhaust waste-gate valve coupled to a turbocharger turbine, a recirculation valve coupled to a turbocharger compressor, and a bypass valve coupled to a supercharger compressor staged upstream of the turbocharger compressor; fully opening an intake throttle valve; and actuating an electric motor coupled to the supercharger compressor. In the preceding example, additionally or optionally, the method further comprises adjusting a variable cam timing to maintain intake and exhaust cams at a position for highest volumetric efficiency responsive to the decrease in operator torque demand. In any or all of the preceding examples, additionally or optionally, the drift mode is actuated responsive to an operator selection received via a vehicle display or dashboard, and wherein in the drift mode, the vehicle performs sliding maneuvers. In any or all of the preceding examples, additionally or optionally, the method further comprises, responsive to the operator selection of the drift mode, adjusting vehicle traction control settings to increase engine torque delivered to rear wheels relative to front wheels, and unevenly distribute engine torque between left and ride side vehicle wheels. In any or all of the preceding examples, additionally or optionally, the method further comprises, reducing engine torque output based on the decreased operator torque demand by retarding spark timing from MBT while maintaining the intake throttle fully open until a spark limit is reached, the spark limit based on engine combustion stability and an exhaust catalyst temperature threshold. In any or all of the preceding examples, additionally or optionally, the method further comprises, after the spark limit is reached, further reducing engine torque output by reducing an opening of the intake throttle while maintaining spark timing retarded to the spark limit. In any or all of the preceding examples, additionally or optionally, the method further comprises, responsive to an increase in operator torque demand while operating in the drift mode, maintaining each of the exhaust waste-gate valve, the recirculation valve, the bypass valve closed, and the electric motor actuated, and increasing engine torque output based on the increased torque demand by moving spark timing towards MBT while maintaining the intake throttle fully open, and after spark timing reaches MBT, further increasing engine torque output by increasing an opening of the intake throttle valve while maintaining spark timing at MBT. In any or all of the preceding examples, additionally or optionally, the method further comprises, maintaining a throttle inlet pressure above barometric pressure responsive to each of the increase and decrease in operator torque demand. In any or all of the preceding examples, additionally or optionally, the method further comprises, in response to a decrease in margin to surge for the supercharger compressor, transiently opening the bypass valve, and when the margin to surge increases, returning the bypass valve to a fully closed position.

Another example method for a vehicle engine comprises: responsive to a first operator pedal tip-out, maintaining manifold pressure above barometric pressure by adjusting one or more air path actuators while reducing engine torque by disabling cylinder fueling; and responsive to a second operator pedal tip-out, maintaining manifold pressure above barometric pressure by adjusting the one or more air path actuators while reducing engine torque by retarding spark timing. In the preceding example, additionally or optionally, the method further comprises, responsive to a third operator pedal tip-out, reducing manifold pressure to barometric pressure by adjusting the one or more air path actuators. In any or all of the preceding examples, additionally or optionally, the first operator pedal tip-out occurs while the vehicle is operated in a sand mode, the second operator pedal tip-out occurs while the vehicle is operated in a drift mode, and the third operator pedal tip-out occurs while the vehicle is operated in a default mode. In any or all of the preceding examples, additionally or optionally, the baja mode is selectively actuated responsive to a first operator selection received via a vehicle display or dashboard, the baja mode including the vehicle operated on rocky terrain and in low ambient humidity, wherein the drift mode is selectively actuated responsive to a second operator selection received via the vehicle display or dashboard, the drift mode including sliding vehicle maneuvers, and wherein the default mode is actuated responsive to no operator selection being received. In any or all of the preceding examples, additionally or optionally, the adjusting responsive to each of the first and second operator pedal tip-out includes closing each of an exhaust waste-gate valve coupled to a turbocharger turbine, a recirculation valve coupled to a turbocharger compressor, a bypass valve coupled to a supercharger compressor staged upstream of the turbocharger compressor, and an intake throttle while actuating an electric motor coupled to the supercharger compressor, and wherein the adjusting responsive to the third operator pedal tip-out includes opening each of the exhaust waste-gate valve, the recirculation valve, and the bypass valve while reducing an opening of the intake throttle and while disabling the electric motor. In any or all of the preceding examples, additionally or optionally, the adjusting responsive to each of the first and second operator pedal tip-out further includes adjusting a variable cam timing to maintain intake and exhaust cams at a position of highest volumetric efficiency, and wherein the adjusting responsive to the third operator pedal tip-out further includes adjusting the variable cam timing to move intake and exhaust cams away from the position of highest volumetric efficiency. In any or all of the preceding examples, additionally or optionally, reducing engine torque by retarding spark timing responsive to the operator pedal tip-out in the drift mode includes retarding spark timing until an exhaust catalyst temperature is higher than a threshold, and responsive to engine torque with spark timing retarded being higher than operator demanded torque, maintaining spark timing retarded while reducing the opening of the intake throttle. In any or all of the preceding examples, additionally or optionally, the method further comprises, during each of the first and second operator pedal tip-out, intermittently opening the bypass valve to move a pressure ratio across the supercharger compressor away from a surge limit, and intermittently disabling the electric motor responsive to a state of charge of a battery coupled to the electric motor falling below a threshold charge.

Yet another example method for a boosted vehicle engine comprises: transitioning the engine to a drift mode of operation responsive to an operator selection; and while operating in the drift mode, independent of operator torque demand, maintaining each of an exhaust waste-gate valve coupled to a turbocharger turbine, a recirculation valve coupled to a turbocharger compressor, and a bypass valve coupled to a supercharger compressor, staged upstream of the turbocharger compressor, fully closed, maintaining an intake throttle fully open, and actuating an electric motor coupled to the supercharger compressor. In the preceding example, additionally or optionally, actuating the electric motor includes maintaining a duty cycle of the electric motor at a full duty cycle. In any or all of the preceding examples, additionally or optionally, the method further comprises, while operating in the drift mode, responsive to a decrease in the operator torque demand, reducing engine torque by retarding spark timing from MBT while the intake throttle is fully open until a spark limit is reached, and thereafter further reducing engine torque by maintaining spark timing retarded to the spark limit while reducing an intake throttle opening; and responsive to an increase in the operator torque demand, raising engine torque by advancing spark timing towards MBT while the intake throttle is fully open, and after spark timing reaches MBT, further raising engine torque by maintaining spark timing at MBT while increasing the intake throttle opening.

In a further representation, a method for an engine comprises: responsive to an operator pedal tip-out, disabling fueling while maintaining an exhaust waste-gate valve coupled to a turbine of a turbocharger fully closed, an intake recirculation valve coupled to a compressor of the turbocharger fully closed; and actuating an electric motor to accelerate a supercharger compressor positioned upstream of the turbocharger compressor in an engine intake.

In yet another representation, a method for an engine comprises: during an operator selected drift mode of vehicle operation, independent of an operator torque demand, maintaining an exhaust waste-gate valve coupled to a turbine of a turbocharger fully closed, an intake recirculation valve coupled to a compressor of the turbocharger fully closed, and an electric motor coupled to a supercharger compressor positioned upstream of the turbocharger compressor actuated; and providing the operator demanded torque via adjustments to each of spark timing and an intake throttle opening.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle method, comprising:
responsive to a decrease in operator torque demand:
fully closing each of an exhaust waste-gate valve coupled to a turbocharger turbine, a recirculation valve coupled to a turbocharger compressor, and a bypass valve coupled to a supercharger compressor staged upstream of the turbocharger compressor;
fully opening an intake throttle valve; and
actuating an electric motor coupled to the supercharger compressor.

2. The method of claim 1, further comprising adjusting a variable cam timing to maintain intake and exhaust cams at a position for highest volumetric efficiency responsive to the decrease in operator torque demand.

3. The method of claim 1, wherein actuating the electric motor includes commanding a full duty cycle to the electric motor.

4. The method of claim 1, wherein the decrease in operator torque demand occurs while a vehicle is operated in a driver selected performance mode, wherein the selected performance mode includes one of operating the vehicle on a selected terrain, and operating the vehicle with selected maneuvers.

5. The method of claim 4, wherein the selected performance mode includes one of a sand mode where the vehicle is driven on sandy terrain, a baja mode where the vehicle is driven on a rocky terrain, and a drift mode where the vehicle performs sliding maneuvers.

6. The method of claim 1, further comprising maintaining a throttle inlet pressure above barometric pressure responsive to the decrease in operator torque demand.

7. The method of claim 1, further comprising reducing engine torque output based on the decreased operator torque demand by shutting of fuel to one or more engine cylinders, a number of cylinder fuel injectors deactivated increased as the operator torque demand decreases.

8. The method of claim 1, further comprising, in response to a decrease in margin to surge for the supercharger compressor, transiently opening the bypass valve, and when the margin to surge increases, returning the bypass valve to a fully closed position.

9. The method of claim 1, wherein the decrease in operator torque demand is responsive to an operator pedal tip-out immediately following an operator pedal tip-in.

10. The method claim 1, further comprising maintaining each of the exhaust waste-gate valve, the recirculation valve, and the bypass valve fully closed, the intake throttle valve fully open, and the electric motor actuated responsive to an operator selected vehicle launch mode.

11. A method for a vehicle engine, comprising:
responsive to a first operator pedal tip-out, maintaining manifold pressure above barometric pressure by adjusting one or more air path actuators; and
responsive to a second operator pedal tip-out, reducing manifold pressure to barometric pressure by adjusting the one or more air path actuators.

12. The method of claim 11, wherein the first operator pedal tip-out occurs while a vehicle is operated in a performance mode, and wherein the second operator pedal tip-out occurs while the vehicle is operated in a default mode.

13. The method of claim 12, wherein the performance mode is selectively actuated responsive to an operator selection received via a vehicle display or dashboard, the performance mode including one of a sand mode where the vehicle is operated on sand, and a baja mode where the vehicle is operated on rocky terrain and in low ambient humidity.

14. The method of claim 11, wherein the one or more air path actuators adjusting responsive to the first operator pedal tip-out includes closing each of an exhaust waste-gate valve coupled to a turbocharger turbine, a recirculation valve coupled to a turbocharger compressor, a bypass valve coupled to a supercharger compressor staged upstream of the turbocharger compressor, and an intake throttle while actuating an electric motor coupled to the supercharger compressor, and wherein the one or more air path actuators adjusting responsive to the second operator pedal tip-out includes opening each of the exhaust waste-gate valve, the recirculation valve, and the bypass valve while reducing an opening of the intake throttle and while disabling the electric motor.

15. The method of claim 14, wherein the one or more air path actuators adjusting responsive to the first operator pedal tip-out further includes adjusting a variable cam timing to maintain intake and exhaust cams at a position of highest volumetric efficiency, and wherein the one or more air path actuators adjusting responsive to the second operator pedal tip-out further includes adjusting the variable cam timing to move intake and exhaust cams away from the position of highest volumetric efficiency.

16. The method of claim 14, further comprising, responsive to the first operator pedal tip-out, selectively disabling fuel injectors coupled to a number of cylinders, where the number of cylinders increases as an operator torque demand during the first operator pedal tip-out decreases, and responsive to the second operator pedal tip-out, reducing fuel delivered to all engine cylinders based on the reduced opening of the intake throttle.

17. The method of claim 14, further comprising, during the first operator pedal tip-out, intermittently opening the bypass valve to move a pressure ratio across the supercharger compressor away from a surge limit, and intermittently disabling the electric motor responsive to a state of charge of a battery coupled to the electric motor falling below a threshold charge.

18. A vehicle system, comprising:
an engine having an intake;
a first intake compressor driven by an electric motor;

a second intake compressor driven by an exhaust turbine positioned downstream of the first intake compressor along the intake;
an intake throttle coupled downstream of the second intake compressor;
a waste-gate including a waste-gate valve coupled across the exhaust turbine;
a first compressor bypass including a first valve coupled across the first intake compressor;
a second compressor passage including a second valve coupled across the second intake compressor;
a fuel injector coupled to each cylinder of the engine;
a pressure sensor for estimating a manifold pressure at an inlet of the intake throttle;
a vehicle display including a plurality of operator selectable buttons; and
a controller with computer readable instructions stored on non-transitory memory for:
transitioning the engine to one of a sand or baja mode based on an operator selection received via the vehicle display; and
in response to a decrease in operator demanded torque while in the sand or baja mode, maintaining manifold pressure above barometric pressure by fully closing each of the waste-gate valve, the first valve, and the second valve, fully opening the intake throttle, and actuating the electric motor to a full duty cycle.

19. The system of claim 18, wherein the controller includes further instructions for disabling the fuel injector coupled to a number of cylinders, the number of cylinders selected increased as the operator demanded torque decreases.

20. The system of claim 18, wherein the controller includes further instructions for:
maintaining the engine in a default mode in response to absence of operator selection; and
in response to a decrease in operator demanded torque while in the default mode, reducing manifold pressure to barometric pressure by increasing an opening of each of the waste-gate valve, the first valve, and the second valve, while reducing an opening of the intake throttle, and disabling the electric motor to a zero duty cycle.

* * * * *